US012600031B2

(12) United States Patent
    Golda et al.

(10) Patent No.:     US 12,600,031 B2
(45) Date of Patent:        Apr. 14, 2026

(54) TACTILE ROBOTIC TRAINING PLATFORM

(71) Applicant: Tacta Systems Inc., Palo Alto, CA (US)

(72) Inventors: Dariusz Golda, Portola Valley, CA (US); Nahid Harjee, Sunnyvale, CA (US); Vikram Pavate, Foster City, CA (US); David Weisberg, Mill Valley, CA (US); Andreas Bibl, Los Altos, CA (US)

(73) Assignee: Tacta Systems Inc., Palo Alto, CA (US)

( * ) Notice: Subject to any disclaimer, the term of this patent is extended or adjusted under 35 U.S.C. 154(b) by 156 days.

(21) Appl. No.: 18/435,800

(22) Filed: Feb. 7, 2024

(65) Prior Publication Data

US 2025/0128402 A1      Apr. 24, 2025

Related U.S. Application Data

(60) Provisional application No. 63/592,125, filed on Oct. 20, 2023.

(51) Int. Cl.
    B25J 13/08          (2006.01)
    B25J 9/00          (2006.01)
    (Continued)

(52) U.S. Cl.
    CPC ............. B25J 9/163 (2013.01); B25J 9/0081 (2013.01); B25J 9/1633 (2013.01); B25J 13/06 (2013.01); B25J 13/084 (2013.01); B25J 15/10 (2013.01)

(58) Field of Classification Search
    CPC ........ B25J 9/163; B25J 9/1633; B25J 9/0081; B25J 9/1694; B25J 13/06; B25J 13/085;
    (Continued)

(56) References Cited

U.S. PATENT DOCUMENTS 4,668,861  A      5/1987  White
4,775,961  A      10/1988  Capek et al.
            (Continued)

FOREIGN PATENT DOCUMENTS

CN         109910024  A      6/2019
KR         20100065074  A      6/2010
            (Continued)

OTHER PUBLICATIONS

Notification of Transmittal of the International Search Report and The Written Opinion of the International Searching Authority, or the Declaration issued for PCT Patent Application No. PCT/US2024/048926, mailed on Jan. 3, 2025, 17 pages.
(Continued)

*Primary Examiner* — Dalena Tran
(74) *Attorney, Agent, or Firm* — Aikin & Gallant, LLP

(57)                ABSTRACT

A wearable device may include an article configured to be worn by a user and a sensor array coupled with the article. The sensor array may be configured to obtain force data, among other data. A system can receive information generated by the wearable device utilized to perform a task. The information may include motion data indicating a motion of the wearable device and the force data indicating a force applied to the wearable device. The force data may be obtained from the sensor array generating digital outputs. The system can control a robotic device to perform a robotic motion based on the motion data and apply a robotic force based on the force data to repeat the task. The robotic device may include a sensor array to determine a force applied to the robotic device for controlling the robotic force. Other aspects are also described and claimed.

23 Claims, 29 Drawing Sheets

(51) Int. Cl.
   *B25J 9/16* (2006.01)
   *B25J 13/06* (2006.01)
   *B25J 15/10* (2006.01)

(58) Field of Classification Search
   CPC . B25J 13/084; B25J 15/10; A61B 2562/0219;
       A61B 2562/0247; A61B 5/6804; A61B
       5/7455; G01L 1/146; G01L 1/205; G01L
                                              1/142
   See application file for complete search history.

(56) References Cited

U.S. PATENT DOCUMENTS

| | | | |
|---|---|---|---|
| 5,760,530 | A | 6/1998 | Kolesar |
| 6,593,756 | B1 | 7/2003 | Shmidt et al. |
| 7,168,748 | B2 | 1/2007 | Townsend et al. |
| 7,658,119 | B2 | 2/2010 | Loeb et al. |
| 7,673,528 | B2 | 3/2010 | Yoon et al. |
| 7,673,916 | B2 | 3/2010 | Greenhill et al. |
| 7,707,001 | B2 | 4/2010 | Obinata et al. |
| 7,878,075 | B2 | 2/2011 | Johansson et al. |
| 8,181,540 | B2 | 5/2012 | Loeb et al. |
| 8,272,278 | B2 | 9/2012 | Loeb et al. |
| 8,483,880 | B2 | 7/2013 | De La Rosa Tames et al. |
| 8,934,999 | B2 | 1/2015 | Kalayjian |
| 9,080,918 | B2 | 7/2015 | Loeb et al. |
| 9,381,645 | B1 | 7/2016 | Yarlagadda et al. |
| 9,415,517 | B2 | 8/2016 | Naidu et al. |
| 9,477,909 | B2 | 10/2016 | Loeb et al. |
| 9,613,180 | B1 | 4/2017 | Hoffmann et al. |
| 9,652,037 | B2 | 5/2017 | Rubin et al. |
| 9,904,358 | B2 | 2/2018 | Rubin et al. |
| 10,176,529 | B2 | 1/2019 | Amigo et al. |
| 10,222,859 | B2 | 3/2019 | Rubin et al. |
| 10,666,252 | B2 | 5/2020 | Frangen et al. |
| 10,732,711 | B2 | 8/2020 | Rubin et al. |
| 10,754,308 | B2 | 8/2020 | De Magistris et al. |
| 10,809,804 | B2 | 10/2020 | Goupil et al. |
| 10,824,282 | B2 | 11/2020 | Vallett et al. |
| 10,952,672 | B2 | 3/2021 | Flood et al. |
| 11,006,861 | B2 | 5/2021 | Di Pardo et al. |
| 11,009,949 | B1 | 5/2021 | Elias et al. |
| 11,019,449 | B2 | 5/2021 | Kim et al. |
| 11,061,472 | B2 | 7/2021 | Crockett et al. |
| 11,148,299 | B2 | 10/2021 | Yui |
| 11,162,858 | B2 | 11/2021 | Dade et al. |
| 11,221,263 | B2 | 1/2022 | Tsai et al. |
| 11,243,125 | B2 | 2/2022 | Tsai et al. |
| 11,243,126 | B2 | 2/2022 | Bergemont et al. |
| 11,255,737 | B2 | 2/2022 | Foughi et al. |
| 11,262,797 | B1 | 3/2022 | Hoen et al. |
| 11,267,126 | B2 | 3/2022 | Asano et al. |
| 11,287,340 | B2 | 3/2022 | Jiang et al. |
| 11,312,581 | B2 | 4/2022 | Huang et al. |
| 11,341,826 | B1 | 5/2022 | Wiley et al. |
| 11,371,903 | B2 | 6/2022 | Rogers et al. |
| 11,385,108 | B2 | 7/2022 | Diestelhorst et al. |
| 11,389,968 | B2 | 7/2022 | Alspach et al. |
| 11,400,587 | B2 | 8/2022 | Holly et al. |
| 11,413,748 | B2 | 8/2022 | Colasanto et al. |
| 11,423,686 | B2 | 8/2022 | Tsai et al. |
| 11,433,555 | B2 | 9/2022 | Smith et al. |
| 11,440,183 | B2 | 9/2022 | Huang et al. |
| 11,446,816 | B2 | 9/2022 | Goldberg et al. |
| 11,460,364 | B1 | 10/2022 | Chen |
| 11,460,919 | B1 | 10/2022 | Gashler et al. |
| 11,472,040 | B2 | 10/2022 | Yerazunis et al. |
| 11,534,923 | B1 | 12/2022 | De Arruda Camargo Polido |
| 11,875,694 | B2 | 1/2024 | Yoshimoto et al. |
| 11,900,777 | B2 | 2/2024 | Ishimaru et al. |
| 2007/0035143 | A1 | 2/2007 | Blackwell et al. |
| 2009/0132088 | A1 | 5/2009 | Taitler |
| 2011/0094306 | A1 | 4/2011 | Bratkovski et al. |
| 2012/0065784 | A1 | 3/2012 | Feldman |
| 2013/0204435 | A1 | 8/2013 | Moon et al. |
| 2013/0211579 | A1 | 8/2013 | Kalayjian |
| 2013/0345875 | A1 | 12/2013 | Brooks et al. |
| 2016/0025615 | A1 | 1/2016 | Fishel et al. |
| 2016/0169754 | A1* | 6/2016 | Kowalewski .......... G01L 5/162 |
| | | | 73/862.541 |
| 2017/0086519 | A1 | 3/2017 | Vigano' et al. |
| 2017/0239821 | A1 | 8/2017 | Lessing et al. |
| 2018/0056520 | A1 | 3/2018 | Ozaki et al. |
| 2018/0250830 | A1 | 9/2018 | Hashimoto et al. |
| 2018/0290309 | A1 | 10/2018 | Becker et al. |
| 2019/0314998 | A1 | 10/2019 | Yui |
| 2019/0359424 | A1 | 11/2019 | Avraham |
| 2020/0070354 | A1 | 3/2020 | Nakayama et al. |
| 2020/0126447 | A1* | 4/2020 | Yoshimoto .............. G01D 7/08 |
| 2020/0191704 | A1 | 6/2020 | Redmond et al. |
| 2021/0086364 | A1 | 3/2021 | Handa et al. |
| 2021/0122039 | A1 | 4/2021 | Su et al. |
| 2021/0177341 | A1* | 6/2021 | Singh ................... A61B 5/0002 |
| 2021/0293643 | A1 | 9/2021 | Correll et al. |
| 2021/0315485 | A1 | 10/2021 | Matusik et al. |
| 2021/0373663 | A1 | 12/2021 | Matusik et al. |
| 2022/0096187 | A1 | 3/2022 | Xu et al. |
| 2022/0221357 | A1 | 7/2022 | Elias et al. |
| 2022/0227006 | A1 | 7/2022 | Nabeto et al. |
| 2022/0250253 | A1 | 8/2022 | Nabeto et al. |
| 2022/0297287 | A1 | 9/2022 | Greenwald et al. |
| 2022/0316974 | A1 | 10/2022 | Gruebele et al. |
| 2022/0318459 | A1 | 10/2022 | Narang et al. |
| 2023/0166366 | A1* | 6/2023 | Hsu ................... G05B 19/4183 |
| | | | 702/189 |
| 2023/0226698 | A1 | 7/2023 | Chaki et al. |
| 2023/0341851 | A1 | 10/2023 | Liu et al. |

FOREIGN PATENT DOCUMENTS

| | | |
|---|---|---|
| KR | 20220060064 A | 5/2022 |
| KR | 20230100981 A | 7/2023 |
| TW | 202024896 A | 7/2020 |
| WO | 2016/070078 A1 | 5/2016 |

OTHER PUBLICATIONS

"Learning the signatures of the human grasp using a scalable tactile glove," Subramanian Sundaram, Petr Kellnhofer, Yunzhu Li, Jun-Yan Zhu, Antonio Torralba & Wojciech Matusik; Nature, vol. 569; May 30, 2019; https://doi.org/10.1038/s41586-019-1234-z; 19 pages.

"Conformable amplified lead zirconate titanate sensors with enhanced piezoelectric response for cutaneous pressure monitoring," Canan Dagdeviren, Yewang Su, Pauline Joe, Raissa Yona, Yuhao Liu, Yun-Soung Kim, YongAn Huang, Anoop R. Damadoran, Jing Xia, Lane W. Martin, Yonggang Huang & John A. Rogers; Nature Communications; 5:4496; DOI: 10.1038/ncomms5496; www.nature.com/naturecommunications; Aug. 5, 2014; 42 pages—additional supplementary figures included.

"Performance Metrics and Test Methods for Robotic Hands," Joe Falco, Karl Van Wyk & Elena Messina; Natl. Inst. Stand. Technol. Draft Spec. Publ. 1227; 65 pages; Oct. 2018; CODEN: NSPUE2; https://doi.org/10.6028/NIST.SP.1227-draft; 77 pages.

"Tactile and Vision Perception for Intelligent Humanoids," Shuo Gao, Yanning Dai, & Arokia Nathan; Adv. Intell. Syst. 2022, 4, 2100074; Advanced Intelligent Systems published by Wiley-VCH GmbH; DOI: 10.1002/aisy.202100074; 28 pages.

"Learning Hand-Eye Coordination for Robotic Grasping with Deep Learning and Large-Scale Data Collection," Sergey Levine, Peter Pastor, Alex Krizhevsky & Deirdre Quillen; arXiv:1603.02199v4 [cs.LG] Aug. 28, 2016; 12 pages.

"Development of a High-speed Multifingered Hand System and Its Application to Catching," Akio Namiki, Yoshiro Imai, Masatoshi Ishikawa & Makoto Kaneko; Proceedings of the 2003 IEEE/RSJ Intl. Conference on Intelligent Robots and Systems; Las Vegas, Nevada; Oct. 2003; pp. 2666-2671.

"Near static strain measurement with piezoelectric films," Arun K. Ramanathan, Leon M. Headings & Marcelo J. Dapino; ScienceDirect Sensors and Actuators A: Physical; journal homepage: www.elsevier.com/locate/sna; 301 (2020) 111654; NSF IUCRC on Smart Vehicle

(56)             References Cited

OTHER PUBLICATIONS

Concepts, Department of Mechanical and Aerospace Engineering, The Ohio State University, USA; Received Aug. 1, 2019; Available online Nov. 17, 2019; 11 pages.
"Learning Object Manipulation with Dexterous Hand-Arm Systems from Human Demonstration," Philipp Ruppel & Jianwei Zhang; 2020 IEEE/RSJ International Conference on Intelligent Robots and Systems (IROS); Oct. 25-29, 2020; Las Vegas, NV, USA (Virtual); Doi: 10.1109/IROS45743.2020.9340966; 8 pages.
An Embedded, Multi-Modal Sensor System for Scalable Robotic and Prosthetic Hand Fingers; Pascal Weiner, Caterina Neef, Yoshihisa Shibata, Yoshihiko Nakamura & Tamim Asfour; Sensors 2020, 20, 101; doi: 10.3390/s20010101 www.mdpi.com/journal/sensors; 22 pages.
Huang et al.; "A Low-Noise and Monolithic Array Tactile Sensor Based on Incremental Delta-Sigma Analog-to-Digital Converters;" Electronics 2022, 11, 1206; https://doi.org/10.3390/electronics11081206; 14 pgs.

* cited by examiner

CROSS-SECTION A-A

CROSS-SECTION B-B

CROSS-SECTION C-C

FIG. 11

TRAINING: MOVE TO TARGET

110

COLOR/ DEPTH CAMERA

126

102

122

TARGET PART

124

OBJECT

COLOR/ DEPTH CAMERA

126

INSERTION PARTS

PARTS TRAY

TARGET

GRASP

TRAJECTORY

Z

Y

X

WEARABLE DEVICE

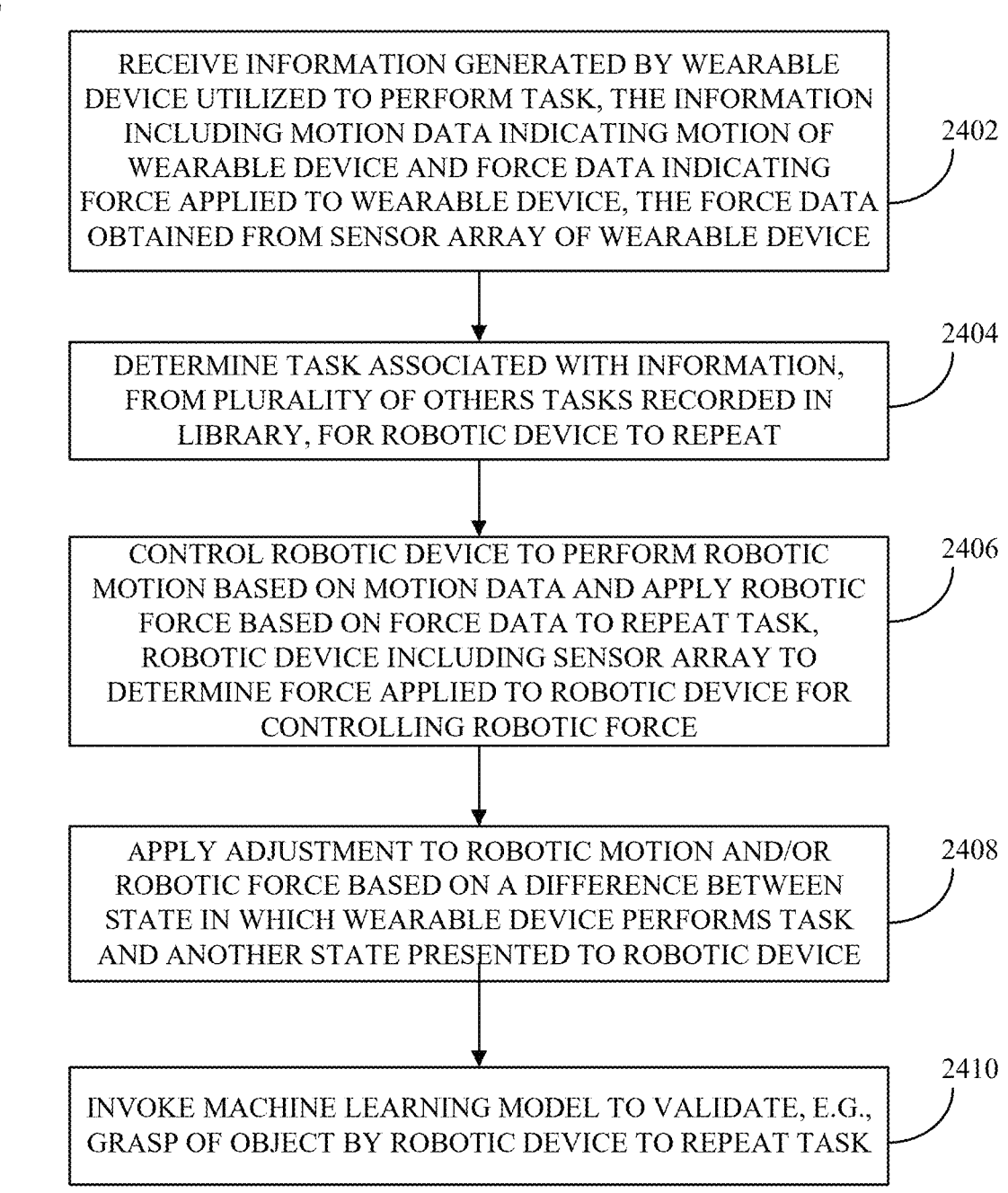

2400

RECEIVE INFORMATION GENERATED BY WEARABLE
DEVICE UTILIZED TO PERFORM TASK, THE INFORMATION
INCLUDING MOTION DATA INDICATING MOTION OF
WEARABLE DEVICE AND FORCE DATA INDICATING
FORCE APPLIED TO WEARABLE DEVICE, THE FORCE DATA
OBTAINED FROM SENSOR ARRAY OF WEARABLE DEVICE

2402

DETERMINE TASK ASSOCIATED WITH INFORMATION,
FROM PLURALITY OF OTHERS TASKS RECORDED IN
LIBRARY, FOR ROBOTIC DEVICE TO REPEAT

2404

CONTROL ROBOTIC DEVICE TO PERFORM ROBOTIC
MOTION BASED ON MOTION DATA AND APPLY ROBOTIC
FORCE BASED ON FORCE DATA TO REPEAT TASK,
ROBOTIC DEVICE INCLUDING SENSOR ARRAY TO
DETERMINE FORCE APPLIED TO ROBOTIC DEVICE FOR
CONTROLLING ROBOTIC FORCE

2406

APPLY ADJUSTMENT TO ROBOTIC MOTION AND/OR
ROBOTIC FORCE BASED ON A DIFFERENCE BETWEEN
STATE IN WHICH WEARABLE DEVICE PERFORMS TASK
AND ANOTHER STATE PRESENTED TO ROBOTIC DEVICE

2408

INVOKE MACHINE LEARNING MODEL TO VALIDATE, E.G.,
GRASP OF OBJECT BY ROBOTIC DEVICE TO REPEAT TASK

TACTILE ROBOTIC TRAINING PLATFORM

RELATED APPLICATIONS

This application claims the benefit of priority from U.S. Provisional Patent Application No. 63/592,125 filed on Oct. 20, 2023, the full disclosure of which is incorporated herein by reference.

BACKGROUND

Field

This disclosure relates generally to robotic control and, more specifically, to a tactile robotic training platform. Other aspects are also described.

Background Information

A robotic device, or robot, may refer to a machine that can automatically perform one or more actions or tasks in an environment. For example, a robotic device could be configured to assist with manufacturing, assembly, packaging, maintenance, cleaning, transportation, exploration, surgery, or safety protocols, among other things. A robotic device can include various mechanical components, such as a robotic arm and an end effector, to interact with the surrounding environment and to perform the tasks. A robotic device can also include a processor or controller executing instructions stored in memory to configure the robotic device to perform the tasks.

SUMMARY

Implementations of this disclosure include utilizing a wearable device and/or a robotic device with a tactile sensor array configured to replicate human-scale tactile sensing, touch, grasp, and/or dexterity. In some implementations, the wearable device may include an article configured to be worn by a user and a sensor array coupled with the article. For example, the wearable device could be a sensing glove, and the article could be a glove comprised of fabric or elastomer to be worn on the hand of the user. The sensor array may include sensors that provide multimodal sensing (e.g., micro-sensing of various conditions, such as normal forces, shear forces, temperatures, proximities, and/or images associated with objects, via normal force sensors, shear force sensors, thermal sensors, proximity sensors, image sensors (e.g., RGB cameras), and/or inertial sensors, such as inertial measurement units (IMU)). In some implementations, the sensors may comprise micro-sensors which may be submillimeter in at least one in-plane dimension associated with a footprint, and/or may be arranged at a pitch of 3 millimeters or less (e.g., less than 3 millimeters (mm) between footprints of sensors). The sensor array may be configured to obtain force data indicating a force applied to the wearable device (e.g., tactile sensing, via normal force sensors, shear force sensors, and/or other sensing), among other data. Sensors of the wearable device may also be configured to obtain motion data indicating a motion of the wearable device (e.g., a trajectory, position, orientation, velocity, or acceleration). Other aspects are also described and claimed.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have particular advantages not specifically recited in the above summary.

BRIEF DESCRIPTION OF THE DRAWINGS

Several aspects of the disclosure herein are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

FIG. 11 is an example of training a robotic device based on sub-tasks.

FIG. 24 is a flowchart of an example of a process for utilizing a wearable device and/or controlling a robotic device.

DETAILED DESCRIPTION

Figure 1:
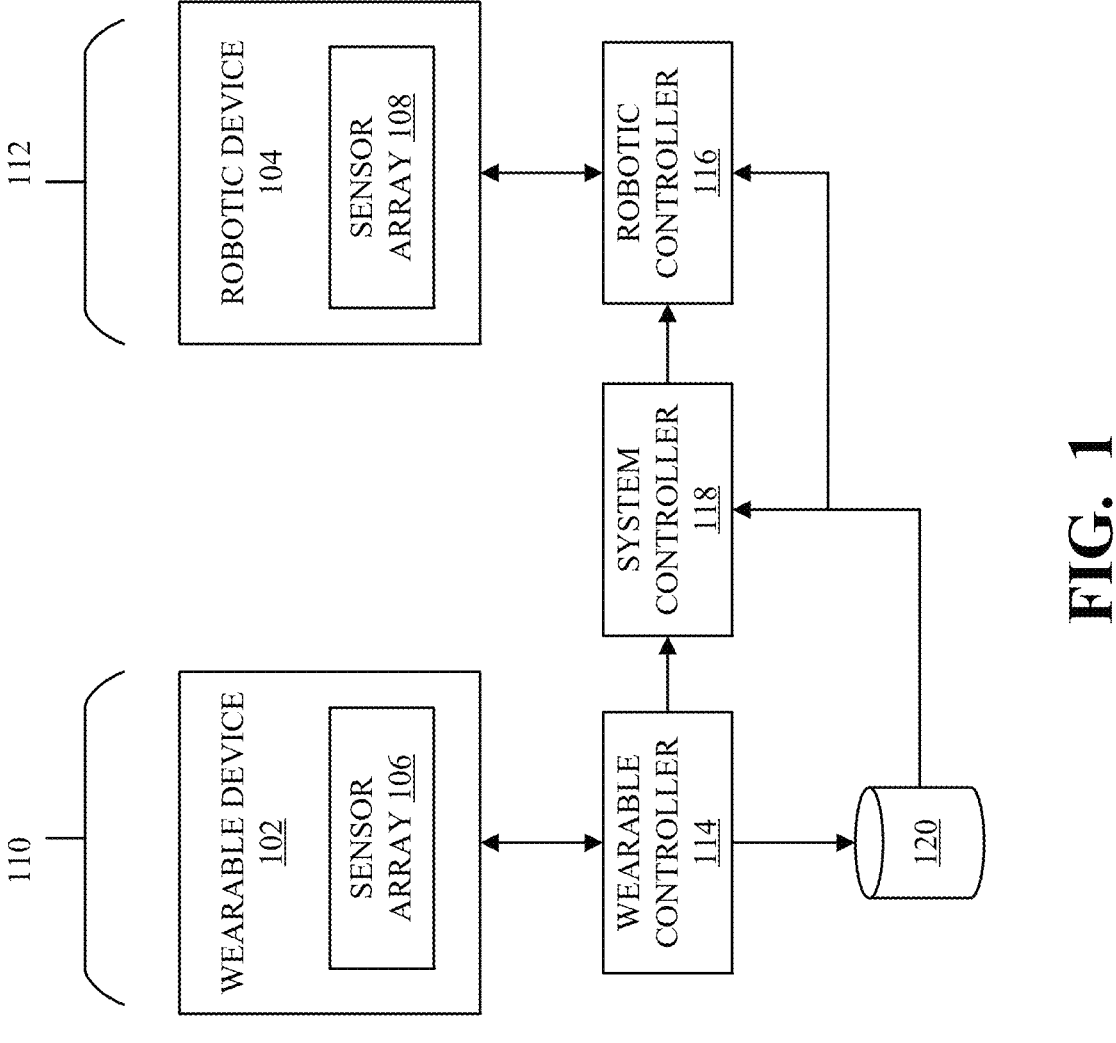
FIG. 1 is an example of a system utilizing a wearable device with tactile sensing to control a robotic device with tactile sensing.

Robotic devices may have difficulty performing the various fine detail work that humans can perform. For example, certain manufacturing or assembly tasks may involve the precision handling of discrete components and/or fine manipulation of small tools in relation to small targets (e.g., smaller than the human hand). While humans routinely manage these tasks, robotic devices often struggle with them. As a result, robotic devices are traditionally utilized for less detailed work, such as picking and placing larger objects, manipulating larger items, and other coarse work. Further, robotic devices may have difficulty perceiving changes that may occur when performing various tasks. For example, while a robotic device can be programmed to perform a task in a particular way, such as picking up an object, when a change in state occurs, such as difference in the object's size or location, or an obstruction blocking a pathway to the object, the robotic device may struggle to complete the task.

Implementations of this disclosure address problems such as these by utilizing a wearable device and/or a robotic device with a tactile sensor array configured to replicate human-scale tactile sensing, touch, grasp, and/or dexterity. In some implementations, the wearable device may include an article configured to be worn by a user and a sensor array coupled with the article. For example, the wearable device could be a sensing glove, and the article could be a glove comprised of fabric or elastomer to be worn on the hand of the user. The sensor array may include sensors that provide multimodal sensing (e.g., micro-sensing of various conditions, such as normal forces, shear forces, temperatures, proximities, and/or images associated with objects, via normal force sensors, shear force sensors, thermal sensors, proximity sensors, image sensors (e.g., RGB cameras), and/or inertial sensors, such as inertial measurement units (IMU)). In some implementations, the sensors may comprise micro-sensors which may be submillimeter in at least one in-plane dimension associated with a footprint, and/or may be arranged at a pitch of 3 mm or less (e.g., less than 3 mm between footprints of sensors). The sensor array may be configured to obtain force data indicating a force applied to the wearable device (e.g., tactile sensing, via normal force sensors, shear force sensors, and/or other sensing), among other data. Sensors of the wearable device may also be configured to obtain motion data indicating a motion of the wearable device (e.g., a trajectory, position, orientation, velocity, or acceleration).

In some implementations, a system can receive information generated by the wearable when utilized to perform a task. For example, a user can wear the wearable device when performing a task, such as picking up an object from a parts tray and inserting the object into a target part in a demonstration environment. The information may include motion data indicating a motion of the wearable device and force data indicating a force applied to the wearable device. The force data may be obtained from the sensor array of the wearable device (e.g., the tactile sensing, via normal force sensors, shear force sensors, and/or other sensing) generating digital outputs. The system can then control a robotic device to perform a robotic motion based on the motion data, and apply a robotic force based on the force data, to repeat the task. For example, to repeat a pick and place task, the system can control the robotic device to pick up an object from a parts tray and insert the object into a target part in a robotic environment, mirroring the user's performance of picking up an object from a parts tray and inserting the object into a target part in the demonstration environment.

The robotic device may also include a sensor array (e.g., tactile sensing, via normal force sensors, shear force sensors, and/or other sensing) generating digital outputs. The sensor array of the robotic device may correspond to, and/or mirror, the sensor array of the wearable device. The robotic device may utilize the sensor array to determine a force applied to the robotic device for controlling the robotic force. For example, the robotic device may apply the robotic force until the force that is sensed by the sensor array of the robotic device equals the force that is sensed by the sensor array of the wearable device. The robotic device may also utilize sensors to determine a motion of the robotic device for controlling the robotic motion. For example, the robotic device may perform the robotic motion until the motion that is sensed by the sensors of the robotic device equals the motion that is sensed by the sensors of the wearable device.

In some implementations, the robotic device can utilize sensing from the sensor array to adapt to changes in the robotic environment (e.g., relative to the demonstration environment) perceived by the robotic device. In some implementations, the system may invoke a machine learning model to validate tasks and/or sub-tasks that are performed (e.g., grasping the object), and/or to adapt to changes that are perceived. As a result, the robotic device can be configured to perform the fine detail work that humans can perform, and/or may adapt to the changes that humans may adapt to when perceiving state changes when performing the various tasks.

The wearable device and/or the robotic device may include a tactile sensor array that is hyper-tactile with human-like sensing, touch, grasp, and/or dexterity. The sensor array may be hyper-tactile based on including sensors at the pitch of human touch. For example, humans can resolve objects as being spatially separate when they are >2 mm apart (e.g., Meissner corpuscles at the fingertips). As such, the sensor array disclosed herein may include sensors configured at 2× this spatial frequency (e.g., 1 mm pitch) or more, enabling the sensor array to also resolve objects that are 2 mm spacing (or less). In some implementations, the sensor arrays, groups of sensors of the sensor arrays, and/or individual sensors may be configured the same between the wearable device and the robotic device. Each sensor array may enable multimodal sensing (e.g., sensing of different forces, temperatures, proximities, motions, and/or images) via sensors configured at the pitch of human touch with a 10× sampling rate and 100× dynamic range. This may enable, for example, configuring the wearable device and/or the robotic device for performing the fine detail work that humans can perform. For example, the 10× sampling rate may include sampling digital data from sensors (e.g., via controllers and/or other circuitry) at a rate that is faster than humans performing tasks. In another example, the 100× dynamic range may enable sensing pressures (e.g., from 1.5 mg/mm$^2$ to 100 g/mm$^2$) in a range that includes and/or exceeds human touch. The wearable device may generate tactile data (e.g., applied forces), orientation data (e.g., motions), and/or imaging data in the demonstration of a task, and the robotic device may similarly generate tactile data, orientation data, and/or imaging data that it may utilize in repeating that task.

In some implementations, the wearable device may be a sensing glove. For example, a human can wear the sensing glove on their hand to demonstrate a task involving an object and a target in a demonstration environment. The task may comprise sub-tasks that are each time-synchronized and, in some cases, recorded in a library stored in a data structure. A camera may be utilized in the demonstration environment to detect color data (e.g., RGB) and/or depth data (e.g., spatial orientation) of the object and/or the target in the performance of the task.

In some implementations, the robotic device may comprise a robotic hand (e.g., including a mechanical thumb, fingers, and palm) or a robotic pinch gripper. For example, the robotic device may include an end effector configured as robotic hand, mapped to the wearable device, which may enable various degrees of freedom (DOF) that are analogous to the human hand, such as at least six DOF involving the thumb, fingers, and/or palm. In another example, the robotic device may include an end effector configured as a robotic pinch gripper (e.g., two or more robotic fingers) mapped to the wearable device. In some cases, the robotic device (e.g., including the robotic hand or the robotic pinch gripper) may be attached to a robotic arm to repeat tasks in the robotic environment. The robotic arm may enable further DOF, such as at least six additional DOF.

In some cases, the robotic device may repeat a task in real-time with the wearable device demonstrating the task. For example, the robotic device may be controlled in real time with the information that is generated by the wearable device performing the task to enable teleoperation (e.g., live control of the robotic device via the wearable device). In some cases, the robotic device may repeat the task based on accessing the task in a library (e.g., the task, including the multiple sub-tasks that are time-synchronized and recorded in the data structure). For example, the robotic device may be controlled to repeat the task multiple times, and/or repeat the task at a later date or time. Thus, in some cases, the robotic device may be controlled based on historical information from the wearable device. A camera may also be utilized in the robotic environment to detect color data (e.g., RGB) and/or depth data (e.g., spatial orientation) of the object and/or the target for repeating the task.

In some implementations, the wearable device and/or the robotic device may utilize the sensor array to replicate human sensory input. For example, the wearable device may be a sensing glove that replicates hand sensory input, and the robotic device may be a robotic hand that also replicates hand sensory input. The sensor array may be configured for multimodal sensing, such as normal force sensing, shear force sensing, thermal sensing, proximity sensing, image sensing, motion sensing, and/or other inertial sensing. In some cases, the sensor array may include groups of sensors with each group connecting to circuitry that performs various functions, such as amplification, filtering, and/or analog to digital conversion (ADC). For example, the circuitry in each group could comprise a controller. In some cases, the circuitry may be distributed throughout the sensor array in the various groups, and throughout the wearable device, to enable high bandwidth data transfer and/or low noise/drift. In some cases, the sensor array may include heterogeneous groups. For example, one group may be configured for one type of sensing (e.g., force and proximity sensing, such as in the fingers), and another group may be configured for another type of sensing (e.g., thermal and/or imaging, such as in the palm). In another example, one group may be configured with circuitry to perform ADC, and another group may be configured without such circuitry.

In some implementations, sensors of the sensor array may comprise piezoelectric sensors, piezoresistive sensors, metal foil strain sensors (e.g., strain gauge), and/or capacitive sensors. In some implementations, the sensors may be connected to conductive threads of an article (e.g., to conductive threads woven into fabric, such as the fabric of a glove). In some implementations, sensors of the sensor array may be coupled with a flexible substrate and interconnect (e.g., a flexible circuit) that is adhered to the article.

In some implementations, the sensor may comprise micro-sensors. In some cases, the sensors may have a pitch of 3 mm or less, and in some cases, a pitch of 1 mm or less, to enable a high density of sensing. For example, when the wearable device is a sensing glove, the pitch may enable the glove to include more than 1,000 sensors coupled with the outer surface, and in some cases, more than 10,000 coupled with the outer surface. The sensors may also enable a high dynamic sensing range, such as a pressure range that encompasses a skin puncture threshold and a lower limit of human touch. For example, the pressure range includes 1.5 mg/mm² to 100 g/mm². Additionally, the wearable device may be substantially thin, e.g., less than 2 mm, and flexible for unobtrusive sensing while worn.

In some implementations, a system may utilize training data analysis, including motion and force readings from the wearable device (e.g., via sensors of the sensor array), to control the robotic device in a closed loop control system. The system may include a force controller to apply a robotic force, sensing a measured force applied to the robotic device (e.g., tactile data, sensed via sensors of the sensor array), a motion controller to perform a robotic motion (e.g., a trajectory, position, orientation, velocity, or acceleration), and sensing a measured motion performed by the robotic device (e.g., via one or more inertial sensors of the robotic device). The system can control the robotic force and the robotic motion based on the force data and the motion data from the wearable device. In some cases, the system may utilize a machine learning model, such as a convolutional neural network (CNN), to validate tasks, sub-tasks (e.g., grasping), and/or to adapt to changes that are perceived in the robotic environment.

FIG. 1 is an example of a system 100 utilizing a wearable device 102 with tactile sensing to control a robotic device 104 with tactile sensing. The wearable device 102 may include a sensor array 106 and the robotic device 104 may include a sensor array 108. The sensor array 106 and the sensor array 108 may each be configured to replicate human-scale tactile sensing, touch, grasp, and/or dexterity. The sensor array 106 and the sensor array 108 may be similarly configured. For example, the sensor array 106 and the sensor array 108 may mirror or correspond to one another, and in some cases, be identical to one another. In some implementations, the sensor array 106 may comprise a scaled version of the sensor array 108 (or the sensor array 108 may comprise a scaled version of the sensor array 106). For example, the sensor array 106 could be scaled N times smaller or N times larger than the sensor array 108 (e.g., in terms of sensors and/or pitch), where N is a value greater than 1.

The wearable device 102 may operate in a demonstration environment 110 and the robotic device 104 may operate in a robotic environment 112. For example, the demonstration environment 110 could be in a first location associated with a manufacturing, assembly, or packaging plant, or a laboratory, office, surgical center, or other function, and the robotic environment 112 could be in a second location associated with another manufacturing, assembly, or packaging plant, or another laboratory, office, surgical center, or other function. In some cases, the demonstration environment 110 and the robotic environment 112 may be adjacent to one another at a same location. For example, the demonstration environment 110 could be a workbench next to the robotic environment 112 at another workbench. The robotic device 104 can include various mechanical components, such as a robotic arm and an end effector (e.g., a robotic hand or pinch gripper), to interact with objects in the robotic environment 112, repeating tasks performed in the demonstration environment 110, as described herein.

The system 100 may also include a wearable controller 114, a robotic controller 116, a system controller 118, and/or a data structure 120. The wearable controller 114 may be in communication with the wearable device 102, including the sensor array 106, and in some cases, the data structure 120. The robotic controller 116 may be in communication with the robotic device 104, including the sensor array 108, and in some cases the data structure 120. The system controller 118 may be in communication with the wearable controller 114, the robotic controller 116, and/or the data structure 120. In some implementations, functionality of one or more of the wearable controller 114, the robotic controller 116, and/or the system controller 118 may be integrated with one another. In some implementations, the system 100 may include a single wearable device 102 and multiple robotic devices 104 (e.g., one to many), multiple wearable devices 102 and a single robotic device 104 (e.g., many to one), or multiple wearable devices 102 and multiple robotic devices 104 (e.g., many to many). Thus, the system controller 118 can communicate with one or more wearable controllers like the wearable controller 114 and/or one or more robotic controllers like the robotic controller 116.

Figure 2:
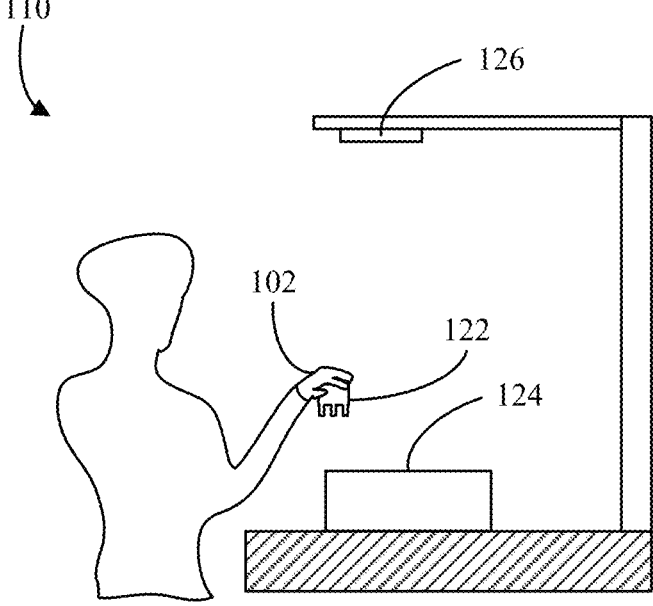
FIG. 2 is an example of an environment in which a wearable device is utilized.

In operation, the wearable controller 114 can receive information generated by the wearable device 102 when the wearable device 102 is utilized to perform a task in the demonstration environment 110. Examples of tasks provided herein are merely illustrative examples of the many different tasks that can be performed in accordance with embodiments, and the embodiments are not limited to these specific tasks. For example, with additional reference to FIG. 2, a user can wear the wearable device 102 to perform a task, such as a glove used to pick up an object 122 (e.g., a soldering iron) and apply the object 122 in relation to a target 124 (e.g., a circuit board). The information may include motion data indicating a motion of the wearable device 102 and force data indicating a force applied to the wearable device 102. The force data may be obtained from the sensor array 106 (e.g., tactile sensing, via normal force sensors, shear force sensors, and/or other multimodal sensing) generating digital outputs. The motion data (e.g., a trajectory, position, orientation, velocity, or acceleration) may also be obtained from the sensor array 106 (e.g., motion sensing, via one or more inertial sensors coupled with the wearable device 102, such as one or more IMUs). The sensor array 106 and the sensor array 108 may be similarly configured. For example, groups of sensors of those sensor arrays, and/or individual sensors of those sensor arrays, may be configured the same.

In some implementations, a camera 126 may also be utilized in the demonstration environment 110. The camera 126 can generate color data (e.g., RGB) and/or depth data (e.g., spatial orientation) associated with the object 122 and/or the target 124. The color data and/or the depth data may be generated in conjunction with the force data and the motion data from the wearable device 102.

A controller, such as the wearable controller 114, the system controller 118, and/or the robotic controller 116, may divide the task into multiple sub-tasks or primitives with time-synchronizations (e.g., time slices). Examples of sub-tasks or primitives provided herein are merely illustrational examples of the many different sub-tasks that can be performed in accordance with embodiments, and the embodiments are not limited to these specific sub-tasks. For example, the sub-tasks or primitives may include approaching an object at a first time, grasping the object at a second time, orienting the object at a third time, traversing with the object at a fourth time, and inserting the object in the target at a fifth time. Other examples of sub-tasks or primitives may include, but are not limited to, picking a component from a tray or bin, lifting an assembly from a conveyor, placing an assembly on a conveyor, picking up a tool (e.g., a screwdriver), utilizing a tool (e.g., applying a screwdriver to a bolt and twisting), inserting a connector into a socket, disconnecting a connector from a socket, wire routing, wire tucking; and connector inspection. The sub-tasks or primitives may be stored in a library in the data structure 120. The robotic device 104 may then be trained, via the controller invoking a machine learning model, to perform sub-tasks or primitives to complete the task. For example, the wearable controller 114 may record the task, including the sub-tasks or primitives, in the library in the data structure 120. The task could be to pick and place an object (e.g., pick the object from a parts tray and place the object in a target part), and the sub-tasks or primitives could include the approaching, the grasping, the orienting, the traversing, and the inserting. The task could have a name, timestamp, and/or other identifier to distinguish the task from other tasks in the library. The robotic device 104, via the robotic controller 116 invoking the machine learning model, can detect sub-tasks or primitives and match each of them to entries in the library (e.g., from raw data collected during a demonstration, such as finger positions, video/images, and/or tactile data). The robotic device 104, via the robotic controller 116, can then join the sub-tasks or primitives together to perform a playback of the task as demonstrated.

The system controller 118 can receive the information generated by the wearable device 102, via the wearable controller 114 and/or the library in the data structure 120. The system controller 118, in turn, can transmit the information to the robotic device 104 to control, via the robotic controller 116. In some cases, the robotic controller 116 can receive the information from the wearable controller 114 or the library in the data structure 120. For example, the robotic controller 116 could bypass the system controller 118, such as in situations where a single wearable device 102 and a single robotic device 104 are present.

To enable teleoperation, the robotic device 104 may be controlled in real time with the wearable controller 114 (e.g., live control of the robotic device 104 via the wearable device 102, as the information is being generated by the wearable device 102). For example, the system controller 118 and/or the robotic controller 116 can receive the information from the wearable controller 114 in real time. To enable repeating the task multiple times, and/or repeating the task at a later date, the robotic device 104 may be controlled based on information in the library in the data structure 120 (e.g., control of the robotic device 104 based on historical information from the wearable device 102). For example, the system controller 118 and/or the robotic controller 116 can receive and/or cache the information from the data structure 120.

Figure 3:
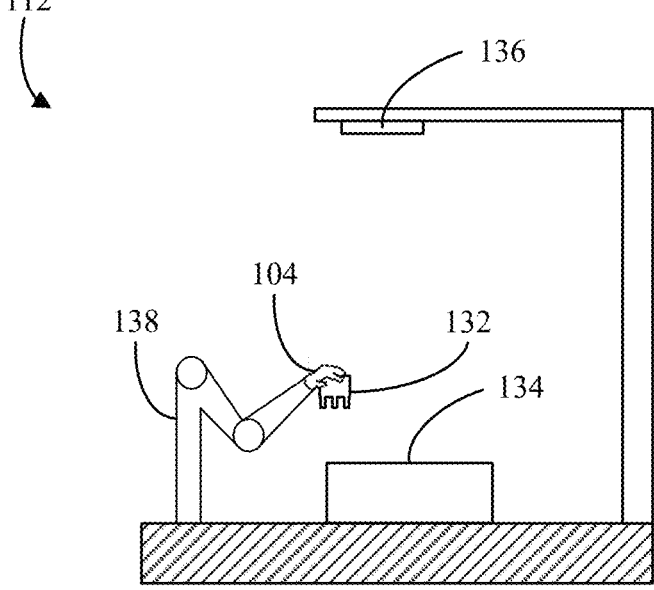
FIG. 3 is an example of an environment in which a robotic device is utilized.

The robotic controller 116 can then control the robotic device 104 to perform a robotic motion based on the motion data from the wearable device 102, and apply a robotic force based on the force data from the wearable device 102, to repeat the task in the robotic environment 112. Examples of tasks provided herein are merely illustrational examples of the many different tasks that can be performed in accordance with embodiments, and the embodiments are not limited to these specific tasks. For example, with additional reference to FIG. 3, the robotic controller 116 can control the robotic device 104 to repeat the task, such as picking up an object 132 (e.g., another soldering iron) and utilizing the object 132 in relation to a target 134 (e.g., another circuit board), mirroring the user's performance of the task in the demonstration environment 110.

For example, the robotic controller 116 may be a robotic hand with at least six DOF, attached to a robotic arm 138 with at least six DOF. In some cases, the robotic controller 116 can control the robotic device 104 to perform each of the sub-tasks (e.g., approaching an object, grasping the object, orienting the object, traversing with the object, and inserting the object, as before in the demonstration environment 110), based on the time-synchronizations associated with the sub-tasks. In some cases, the robotic device 104 may comprise a robotic system wearing the wearable device 102 (e.g., a robotic hand wearing a sensing glove).

In some implementations, a camera 136 may also be utilized in the robotic environment 112, similar to the camera 126 utilized in the demonstration environment 110. The camera 136 can generate color data (e.g., RGB) and/or depth data (e.g., spatial orientation) associated with the object 132 and/or the target 134. The color data and/or the depth data may be generated and utilized in conjunction with the force data, the motion data, the color data, and/or depth data (e.g., from the camera 126) from the wearable controller 114 and/or the data structure 120.

The robotic device 104 can utilize multimodal sensing from the sensor array 108, like the multimodal sensing from the sensor array 106. The multimodal sensing may enable the robotic device 104 to adapt to changes in the robotic environment 112 (e.g., including as compared to the demonstration environment 110) that are perceived by the robotic device 104. For example, the robotic device 104 can utilize sensing from the sensor array 108 to sense and adapt to a difference in the object's size or location (e.g., the object 122 as compared to the object 132), a difference in the target's size or location (e.g., the target 124 as compared to the target 134), and/or an obstruction blocking a pathway to the object 132 or the target 134 (e.g., which was not present relative to the object 122 or the target 124).

In some implementations, the system may invoke a machine learning model to validate the task being performed, one or more sub-task being performed (e.g., grasping the object 132), and/or to adapt to the changes that are perceived (e.g., the differences in sizes, locations, and/or obstructions). For example, robotic controller 116 could invoke a CNN to validate grasping the object 132, and to adjust the force and/or orientation of the robotic device 104 to ensure the grasp, before proceeding to the next sub-task. As a result, the robotic device 104 can be configured to perform the fine detail work that humans can perform, and/or to adapt to changes that humans may adapt to when perceiving state changes in the performance of various tasks.

Figure 4A:
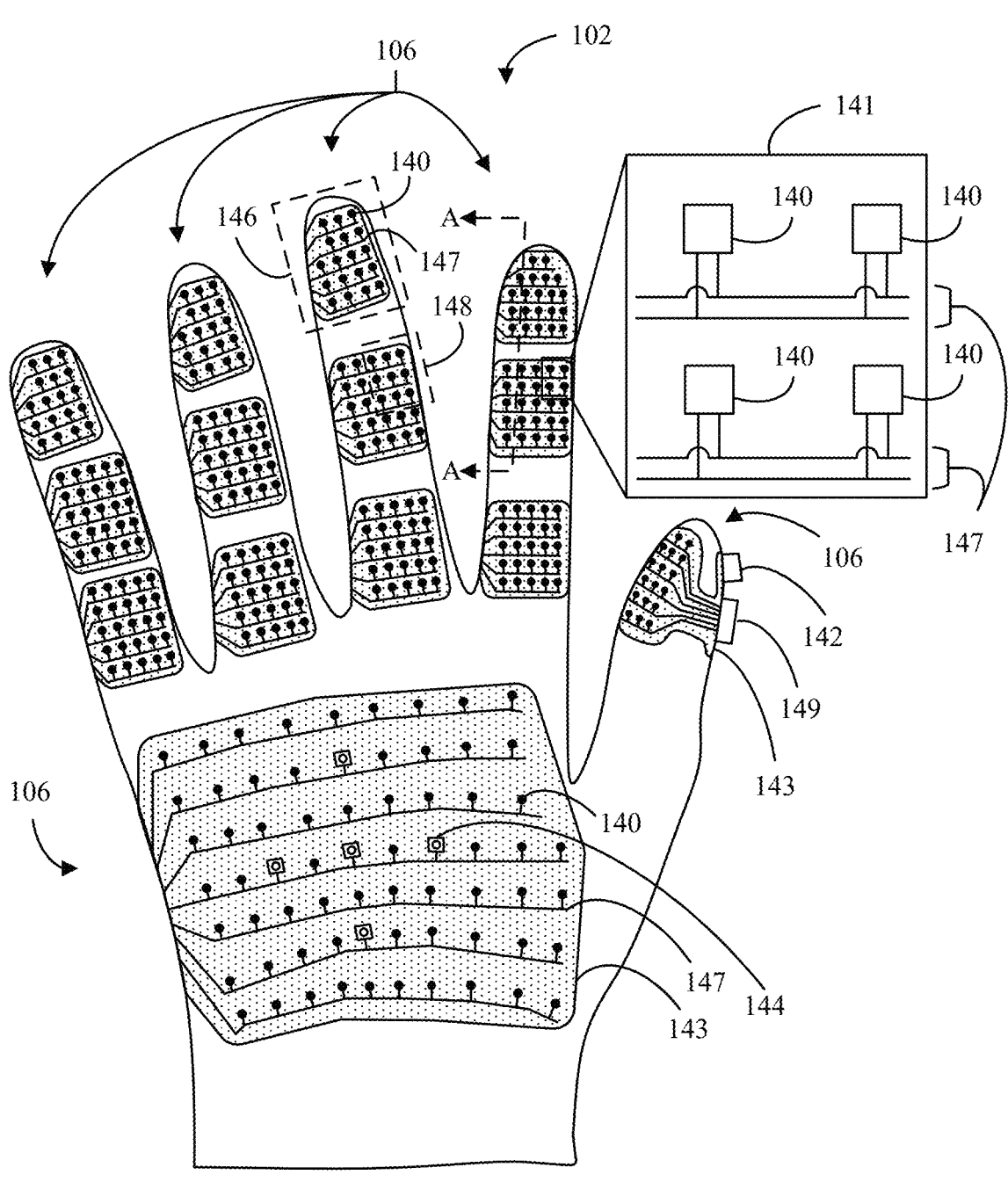
FIG. 4A is an example of a wearable device with tactile sensing.
Figure 4B:
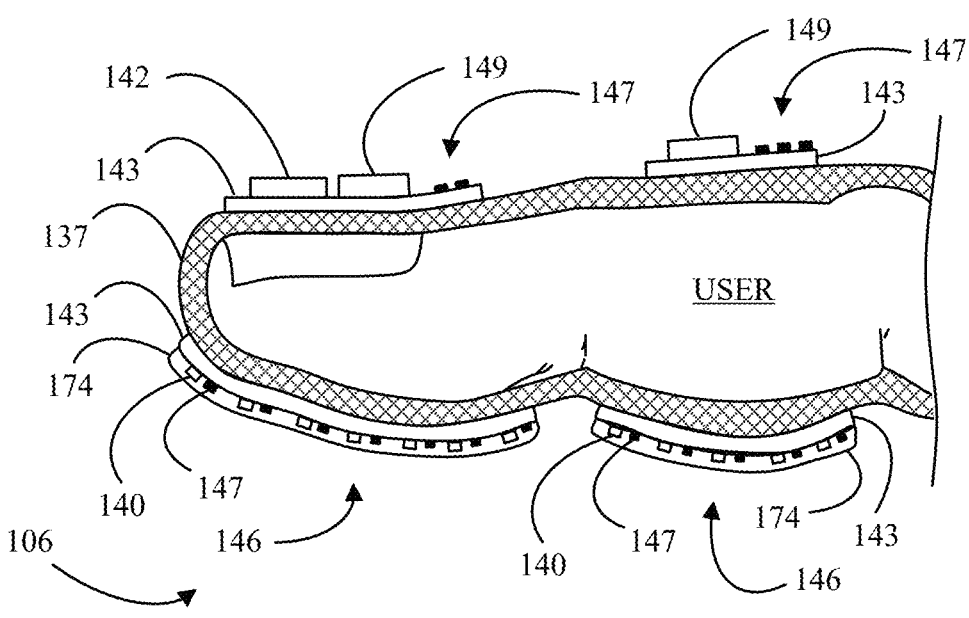
FIG. 4B is a cross-section of a portion of the wearable device.

FIG. 4A is an example of the wearable device 102 with tactile sensing. The wearable device 102 could be configured as a sensing glove as shown. In other cases, the wearable device 102 could comprise another configuration, such as sensing headwear, footwear, eyewear, pants, jackets, braces, patches, socks, sleeves, and the like. For example, the wearable device 102 could comprise a sleeve through which an arm or leg of a user may pass, wrapping completely around the arm or leg of the user when worn. Referring also to FIG. 4B, a cross-section A-A of a portion of the wearable device 102 is shown by way of example. The cross-section includes a user (e.g., a finger) wearing the wearable device 102 (e.g., a sensing glove).

The wearable device 102 may comprise an article 137 (e.g., a textile, fabric, or elastomer) configured to be worn by a user. The article may be configured to flex and stretch with movement. For example, the article could be a glove comprised of a fabric (e.g., a cloth or other material produced by weaving or knitting fibers) or an elastomer (e.g., a natural or synthetic polymer having elastic properties, such as latex or rubber) that can be worn on the hand of a user as shown. For example, referring again to FIG. 2, the user can wear the sensing glove of FIG. 4A on their hand in the demonstration environment 110 to demonstrate the task involving the object 122 and the target 124. While the wearable device 102 shown in FIG. 4A is a right handed sensing glove (shown palmar side), the wearable device 102 could also be configured as a left handed sensing glove. Additionally, the wearable device 102 could be configured as one of multiple wearable devices in a set (e.g., left and right hand gloves, left and right shoes, or sleeves on each limb) where the multiple wearable devices are configured to operate with one another (e.g., via a single wearable controller like the wearable controller 114). In some implementations, sensors of the sensor may be coupled with a flexible substrate and interconnect, e.g., a flexible circuit 143, that is adhered to the article.

The sensor array 106 of the wearable device 102 as shown (and the sensor array 108 of the robotic device 104) may enable hyper-tactile, human-like sensing, touch, grasp, and/or dexterity. The sensor array 106 (and the sensor array 108) may be arranged in different sections of the article, and in some cases in sub-arrays, which may include different layouts, different functions, and/or different sensor resolutions. The sensor array 106 (and the sensor array 108) may include sensors 140 distributed on the outer surface of the article. As shown in a detailed view 141, the sensors 140 may be connected to electrical interconnect 147, including one or more power lines and/or one or more communication lines, such as digital outputs from sensing at the sensor array 106 (and the sensor array 108). In some implementations, the sensors 140 may comprise micro-sensors that enable individual micro-sensing of various conditions (e.g., micro forces, temperatures, proximities, images, and the like). For example, with additional reference to FIG. 5A, each of the sensors may be submillimeter in at least one in-plane dimension (e.g., the X and Y axes shown in FIG. 5A) associated with a footprint of the sensor on the wearable device 102. In another example, each of the sensors may have a pitch (e.g., dimension D shown in FIGS. 5A and 6) of 3 mm or less (representing a distance from one footprint to another), and in some cases, a pitch of 1 mm or less, to enable a high density of sensing. For example, when the wearable device 102 is a sensing glove, the glove may include more than 1,000 sensors on the outer surface, and in some cases, more than 10,000 sensors. In various implementations, the sensors 140 may comprise piezoelectric sensors, piezoresistive sensors, and/or capacitive sensors, among others.

An individual sensor of the sensors 140 could be utilized to sense one or more conditions and to generate one or more signals based on the one or more condition. For example, the sensor could be a normal force sensor that senses a normal force caused by an object in the robotic environment 112, a shear force sensor that senses a shear force caused the object, a thermal sensor that senses a temperature caused by the object, a proximity sensor that senses a proximity or distance to the object (e.g., via piezoelectric-driven ultrasonic waves), or an image sensor that senses an image of the object. The sensors 140 may be configured in different ways to perform a type of sensing. For example, to sense proximity to an object, in one configuration, a single piezoelectric sensor may be configured to transmit an ultrasonic wave at a first time, then reconfigured to sense a reflection of the ultrasonic wave at a second time. In another configuration, a first piezoelectric sensor may be configured to transmit an ultrasonic wave at a first time, and a second piezoelectric sensor may be configured to sense a reflection of the ultrasonic wave at a second time. In another configuration, an array of piezoelectric sensors may be configured to steer ultrasonic waves at first time (e.g., via phase changes between driven ultrasonic waves), and sense a reflection of the steered ultrasonic waves at a second time. In some cases, the sensors 140 may be configured to perform similar sensing in different ways from one another in different locations or sections of the article. For example, to sense proximity to an object, one section may utilize a single piezoelectric sensor configured to transmit an ultrasonic wave and sense a reflection of the ultrasonic wave, whereas another section may utilize an array of piezoelectric sensors to steer ultrasonic waves and sense a reflection of the steered ultrasonic waves. As configured, the sensors 140 may enable a high dynamic sensing range for demonstrating and repeating tasks. For example, a force sensor of the sensor array 106 (or the sensor array 108) could sense a pressure range from 1.5 mg/mm$^2$ to 100 g/mm$^2$ (e.g., a range that encompasses a skin puncture threshold to a lower limit of human touch).

The sensor array 106 (and the sensor array 108) may also include one or more inertial sensors 142 (e.g., a multi-axis IMU, such as a six axis IMU) that sense motion of the wearable device 102 (e.g., a trajectory, position, orientation, velocity, or acceleration). For example, inertial sensors 142 may be arranged on a dorsal side of fingers and/or a thumb of the sensing glove, such as a back of the thumb as shown. The sensor array 106 (and the sensor array 108) may also include one or more camera sensors 144 (e.g., an RGB camera, which may comprise a larger image array than the sensors 140) and/or Lidar (light detection and ranging), which could be arranged in the palm of the sensing glove where less dense force sensing may occur. Thus, the sensor array 106 (and the sensor array 108) may utilize heterogeneous sensors to implement the multimodal sensing. The sensor array 106 may also include one or more local controllers 149 coupled to the sensors 140 via the electrical interconnect 147 (see FIGS. 4B and 8B). The one or more local controllers 149, in turn, may connect to the wearable controller 114. In some implementations, local controllers 149 may be distributed throughout the wearable device 102. The one or more local controllers 149 may be arranged on a dorsal side of the wearable device 102 (e.g., a back of the sensing glove, such as a back of the thumb as shown).

In some implementations, the sensor array 106 (and the sensor array 108) may include separate sections 146, or patches, of sensors 140 coupled with various, different regions of the article (e.g., the outer surfaces). The sections 146 may each generate digital outputs based on sensing by sensors in the sections and based on analog to digital conversion of analog outputs of the sensors in the sections. In some cases, a digital controller may be coupled with one or more sections to receive digital outputs from sensors of the one or more section (e.g., the local controller 149). The digital controller may then generate a second digital output, such as a compressed a bit stream outputting sensing information. For example, when the wearable device 102 is a sensing glove, a first section of the sections 146 could be coupled with a tip of the index finger, a second section could be coupled with a tip of the middle finger, a third section could be coupled with a tip of the ring finger, a fourth section could be coupled with a tip of the little finger, a fifth section could be coupled with a tip of the thumb, a sixth section could be coupled with the palm, and so forth (e.g., areas between joints of fingers/thumb). The sections 146 may enable tactile sensitivity by placing concentrations of the sensors 140 in areas analogous to sensitivities of the human hand. Thus, the sections 146 may be arranged in different regions of the article. Additionally, the sections 146 may include different layouts, different functions, and/or different sensor resolutions.

In some implementations, sensors 140 in sections 146 coupled with some regions of the article may have an increased or decreased pitch (e.g., dimension D shown in FIGS. 5A and 6, having closer or further spacings) as compared to sensors 140 in sections 146 coupled with other regions of the article. For example, sensors 140 in the first section coupled with the tip of the index finger may have a lower pitch (e.g., a closer spacing between sensors), such as 1 mm or less, while sensors 140 coupled with the palm may have a greater pitch (e.g., a further spacing between sensors), such as 5 mm or more.

Figure 5A:
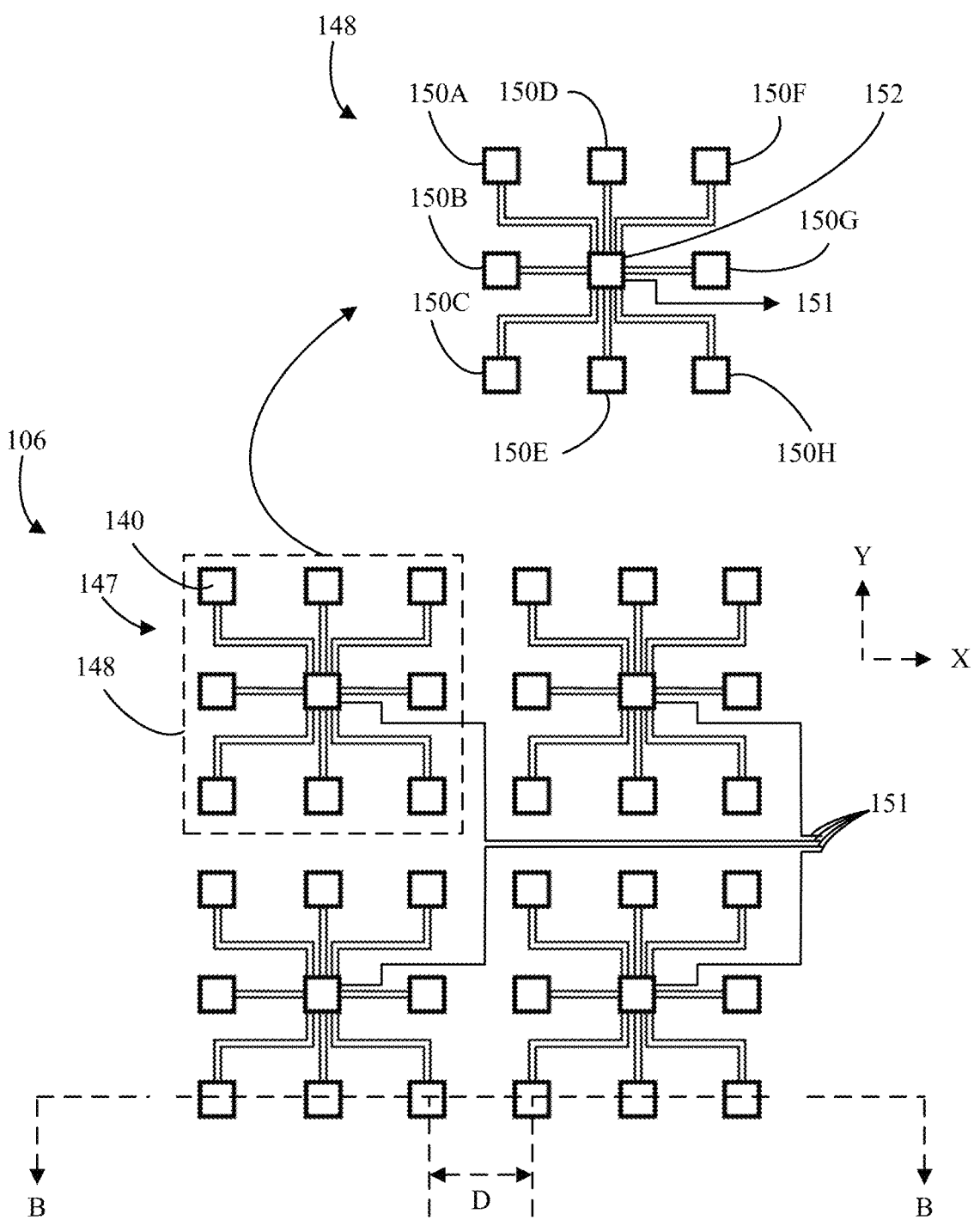
FIG. 5A is an example of a sensor array with tactile sensing.

Referring further to FIG. 5A, in some implementations, the sensor array 106 (and the sensor array 108) may comprise groups 148 of sensors 140, one or more of which may be connected to local circuitry. For example, the circuitry could comprise a controller having a same footprint as other sensors 140. The circuitry in each group may perform various functions with respect to signals from the sensors 140 in that group, such as amplification, filtering, and/or ADC. The circuitry in each group, in turn, may connect to the wearable controller 114 (e.g., via a local controller 149). The wearable controller 114 could be coupled with the wearable device 102 (e.g., on a dorsal side) or arranged wirelessly elsewhere (or when implemented by the sensor array 108, could connect to the robotic controller 116, which could be arranged on the robotic device 104 or arranged wirelessly elsewhere). The groups 148, providing distributed circuitry throughout the wearable device 102 (or the robotic device 104), may enable a reduction of wiring on the device. Additionally, the circuitry distributed throughout the sensor array 106 (or the sensor array 108), via groups 148, may enable high bandwidth data transfer and/or low noise/drift.

Figure 5B:
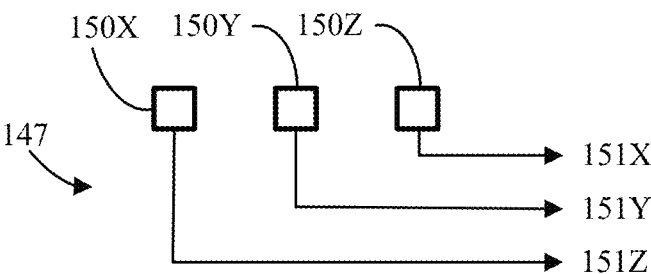
FIG. 5B is an example of sensors generating digital outputs.

For example, as shown in FIG. 5A, the sensor array 106 (or the sensor array 108) may include a group 148 including one or more sensors, such as sensors 150A to 150H, connected to circuitry 152. Sensors 150A and 150C could be normal force sensors, sensors 150B and 150G could be proximity sensors, sensors 150D and 150E could be thermal sensors, sensors 150F and 150H could be shear sensors, and the circuitry 152 could be a controller performing amplification, filtering, and/or ADC of signals from the foregoing sensors (e.g., to generate digital data signals for the wearable controller 114 or the robotic controller 116 at a 10× sampling rate) from the sensors 150A to 150H. In some implementations, the sensors 150A to 150H may generate analog outputs to the circuitry 152, and the circuitry 152 may condition the analog outputs to provide a digital output for the group 148 (e.g., a combined digital output for the group). This may enable each group in the sensor array to include ADC to generate a digital output for the group (e.g., ADC may be integrated with the group). For example, the circuitry 152 may receive analog inputs from each of the sensors (e.g., sensors 150A to 150H), perform analog to digital conversions based on the inputs, and generate a serial bit stream (corresponding to the sensor readings) as the digital output 151. As shown, wiring for the digital outputs 151 may be grouped in a bus line for connection with the wearable controller. In some implementations, one or more sensors in the group 148 may perform analog to digital conversion to generate its own digital output. For example, the circuitry 152 may include a sensor, like any of the sensors 150A to 150H, and may perform analog to digital conversion to generate a bit stream (based on its own sensor readings) as the digital output 151. In some implementations, with additional reference to FIG. 5B, sensors 150X, 150Y, and 150Z in a group (which may be like sensors 150A to 150H in the group 148) may each perform analog to digital conversion to generate bit streams (based on their own sensor readings) as digital outputs 151X, 151Y, and 151Z, respectively. Thus, each sensor may condition its own analog output to generate a digital output.

In some implementations, each sensor may include a sensing element die (e.g., a force sensor) combined with a mixed signal die to convert the sensor's analog signals into a digital representation (e.g., the digital output) in a single integrated device. This may enable each sensor in the sensor array to include ADC to generate a digital output for the sensor (e.g., ADC may be integrated with each sensor). The device (e.g., the sensor) can be placed on a metal wire-pattern flexible or rigid circuit. This may enable a flexible circuit (e.g., coupled with an article) to connect multiple sensors in series with limited metal wiring (e.g., the electrical interconnect 147). In some cases, electrical signals between devices can be reduced by each device sharing a common set of wires, such as power, ground, clock, select, and digital output. By way of example, a select signal could trigger a first device's measurement to be sent via a first digital output. After that measurement is complete, and data of the digital output has been sent, the first device may trigger a second device to then transmit its measurement via a second digital output, and so forth. A controller (e.g., the local controller 149) may provide the inputs to the devices (e.g., the select signal), read the data from the devices (e.g., the digital outputs), and in some cases, perform processing before sending the measurement data to a secondary controller or module that provides external communications, via wired or wireless connections, to the wearable controller 114 (or the robotic controller 116). In some implementations, ADC may be integrated with each sensor in some locations and with a group of sensors in other locations in combination.

Thus, the group 148 may be configured heterogeneously within the group (e.g., sensing different conditions). Additionally the group 148 may be configured heterogeneously as compared to other groups. For example, one group in the sensor array 106 (or the sensor array 108) may be configured for one type of sensing (e.g., force and proximity sensing, such as in the fingers), while another group may be configured in the sensor array for another type of sensing (e.g., thermal and/or imaging, such as in the palm). In another example, one group may be configured for sensing with the circuitry 152 (e.g., ADC, to generate digital data and reduce wiring where denser sensing may be involved, such as the fingertip), while another group may be configured without the circuitry 152 (e.g., where less dense sensing may be involved, such as the palm).

In some implementations, the sensor array 106 may be coupled with the wearable device 102 (or the sensor array 108 may be coupled with the robotic device 104) by connecting the sensors 140 to conductive threads of an article. For example, the conductive threads may be woven into fabric of the article (e.g., threads exposed on outer surfaces of the article, such as the glove).

In some implementations, the sensor array 106 may be coupled with the wearable device 102 (or the sensor array 108 may be coupled with the robotic device 104) by coupling the sensors 140 with a flexible substrate and interconnect (e.g., the flexible circuit 143). For example, with additional reference to FIG. 6 (e.g., an example of a cross-section B-B from FIG. 5A), the sensors 140 may be coupled with a flexible substrate 160 including an interconnect and vias (e.g., connected to the sensors 140 via metal). In some implementations, the flexible substrate 160 may include flex circuitry 162, a polymer layer 164 (e.g., polyimide), a release layer 166, and an adhesive 168. The flexible substrate 160 could be adhered to an outer surface 170 of the article (e.g., the fabric or elastomer) via an adhesive or other mechanism with an inner surface 172 of the article being adjacent to the user (or robotic device). Additionally, the flexible substrate 160, including the sensors 140, may be covered by an encapsulation layer 174 (e.g., silicone) to protect the sensor array 106 from environmental conditions while enabling the sensing.

Figure 6:
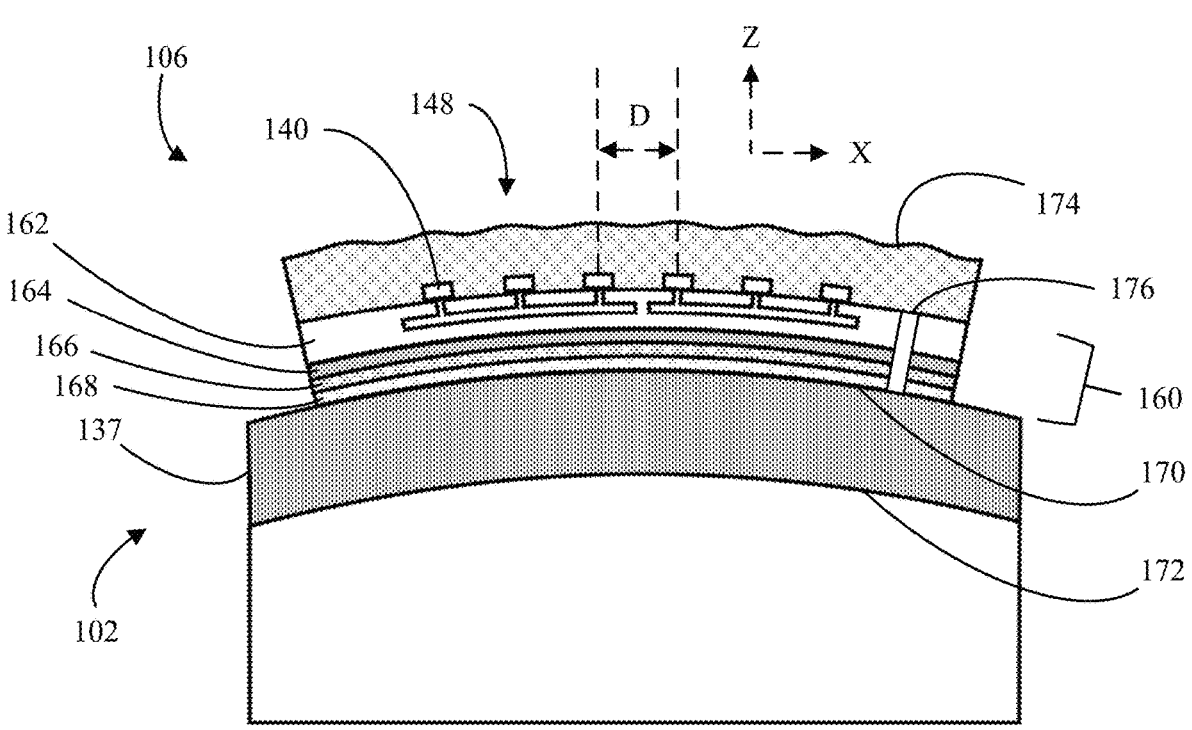
FIG. 6 is an example of a cross-section of a sensor array with tactile sensing.

Based on the dimensions of the sensors 140 as described herein, the wearable device 102 may be advantageously thin (e.g., in the Z axis as shown in FIG. 6). For example, the article, the flexible substrate 160, and the encapsulation layer 174 remain 2 mm or less. Additionally, the flexible substrate 160 may include cutouts 176 between sensors 140 and wiring associated with the sensors 140. The cutouts 176 may enable the wearable device 102 (e.g., the glove) to flex and stretch at select locations, such as between joints of fingers.

Thus, as described herein, the sensor array 106 (and the sensor array 108) may enable multimodal sensing (e.g., differing forces, temperature, proximity, and/or imaging) via sensors 140 configured at a pitch of human touch with a 10× sampling rate and 100× dynamic range to enable precise control, adaptability, and/or efficiency. This may enable, for example, configuring the wearable device 102 and/or the robotic device 104 for performing the fine detail work that humans can perform. For example, the 10× sampling rate may include sampling digital data from sensors 140 (e.g., via the circuitry 152) at a rate that is faster than humans performing tasks. In another example, the 100× dynamic range may enable sensing pressures (e.g., from 1.5 mg/mm$^2$ to 100 g/mm$^2$) in a range that includes and/or exceeds human touch. The wearable device 102 may generate tactile data (e.g., applied forces), orientation data (e.g., motions), and/or imaging data, to perform tasks demonstrated by the user. Further, the robotic device 104 may generate tactile data (e.g., applied forces), orientation data (e.g., motions), and/or imaging data, to repeat the tasks, including the various fine detail work that humans can perform.

Figure 7:
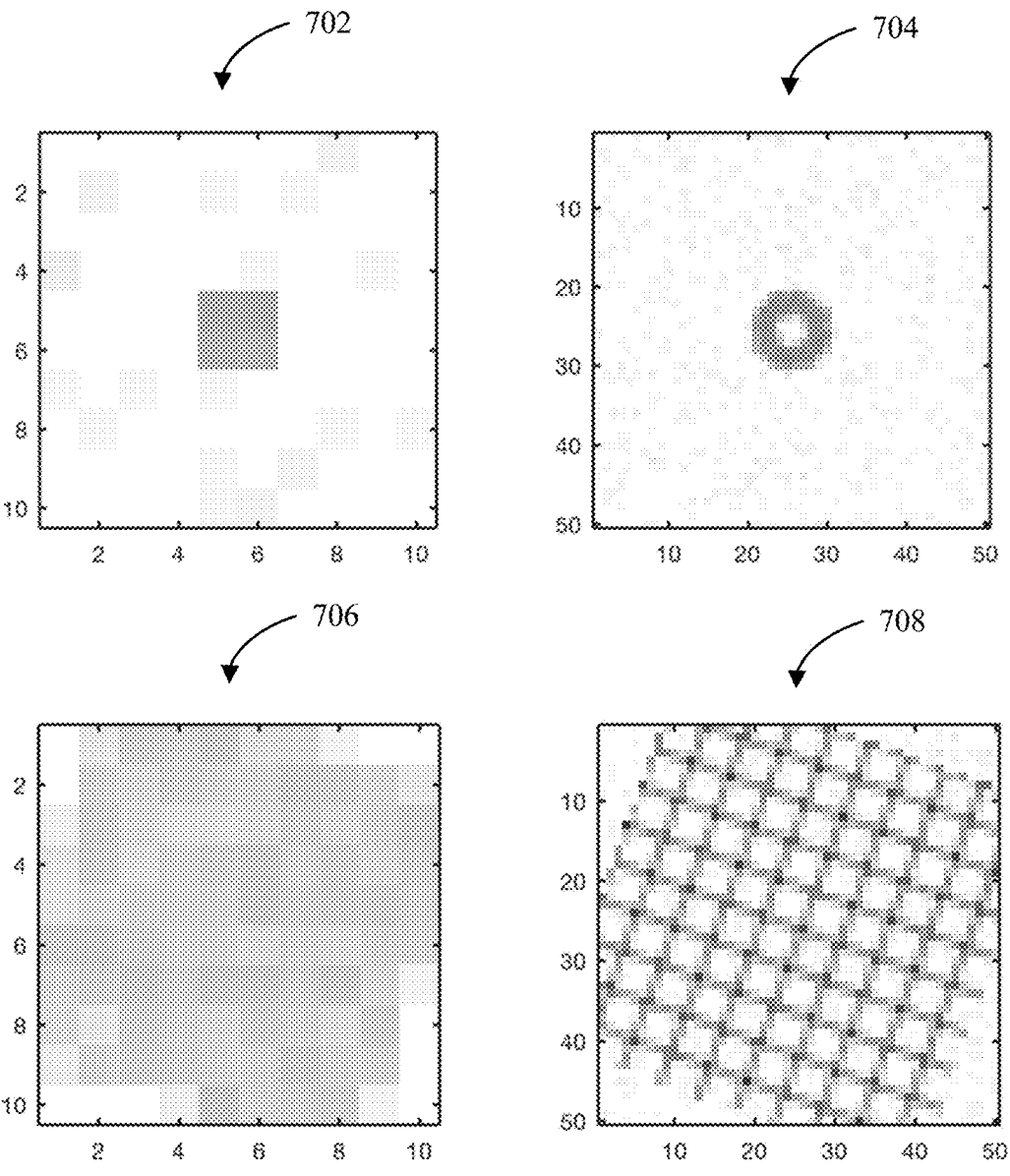
FIG. 7 includes examples of tactile sensing performed by a wearable device or a robotic device.

FIG. 7 includes examples of tactile sensing performed by the wearable device 102 or the robotic device 104 via the sensor array 106 or the sensor array 108, respectively. At 702, when a flat washer having an inner diameter of 4 mm and an outer diameter of 10 mm is present in the demonstration environment 110 or the robotic environment 112, a first implementation of the sensor array 106 or the sensor array 108 (e.g., 10×10 force sensors at 5 mm pitch) may sense certain detail of the object (e.g., a block). At 704, a second implementation of the sensor array 106 or the sensor array 108 (e.g., 50×50 force sensors at 1 mm pitch) may sense greater detail of the object (e.g., a round, flat washer). In another example, at 706, when a wire mesh having 5 mm spacings between strands is present in the demonstration environment 110 or the robotic environment 112, the first implementation of the sensor array 106 or the sensor array 108 may again sense certain detail of the object (e.g., a patterned object). At 708, the second implementation of the sensor array 106 or the sensor array 108 may sense greater detail of the object (e.g., a wire mesh). Thus, the sensor array 106 and the sensor array 108 in implementations can capture various spatial details to perform the fine detail work that humans can perform.

In some implementations, the wearable device 102 can be worn by the robotic device 104 in the robotic environment 112 (e.g., the sensor array 108 could be the same as the sensor array 106). In some implementations, the robotic device 104 may be configured to resemble the wearable device 102 (e.g., the sensor array 108 may mirror or correspond to the sensor array 106, and in some cases, be identical to the sensor array 106).

Figure 8A:
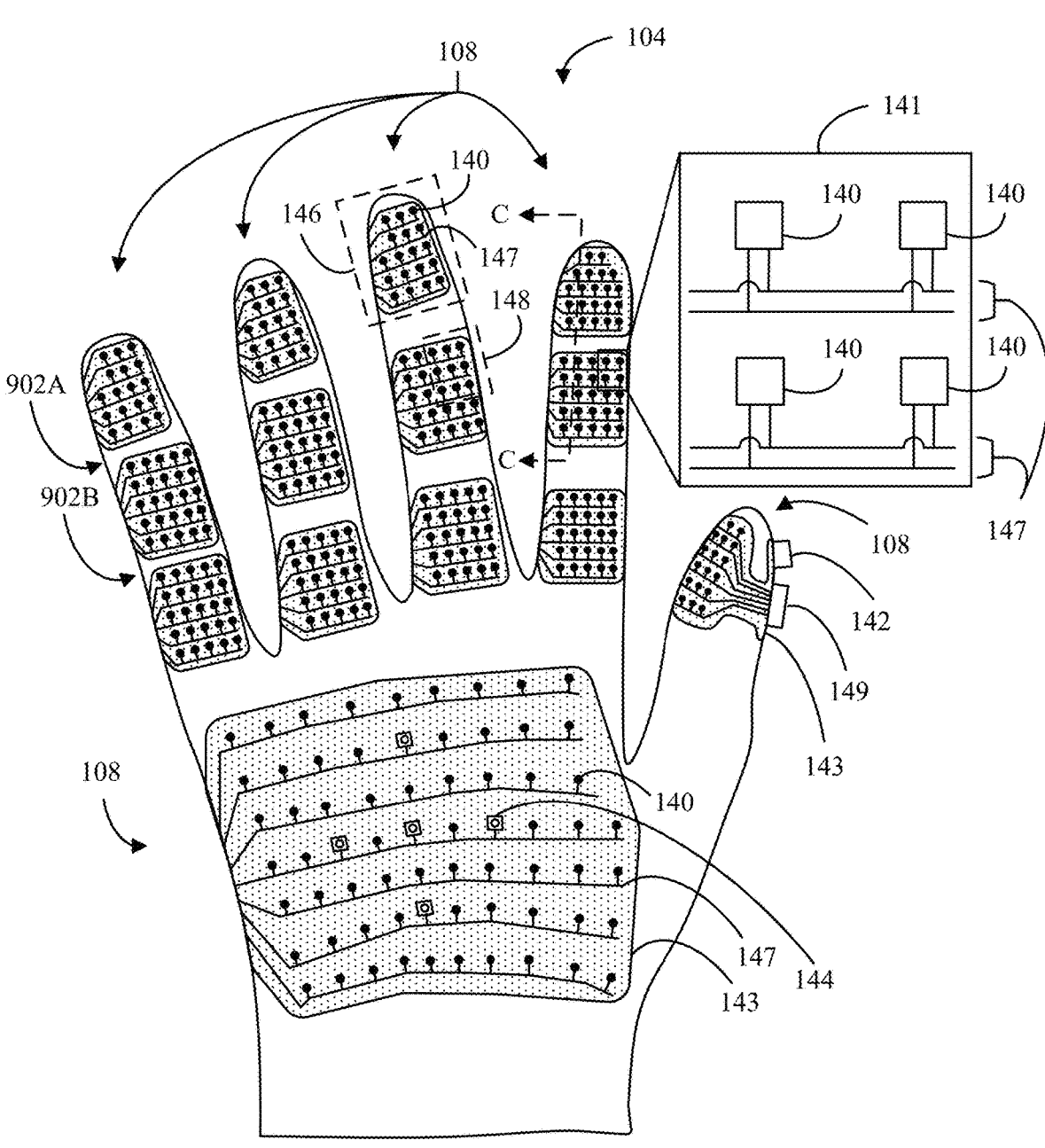
FIG. 8A is an example of a robotic device with tactile sensing.
Figure 8B:
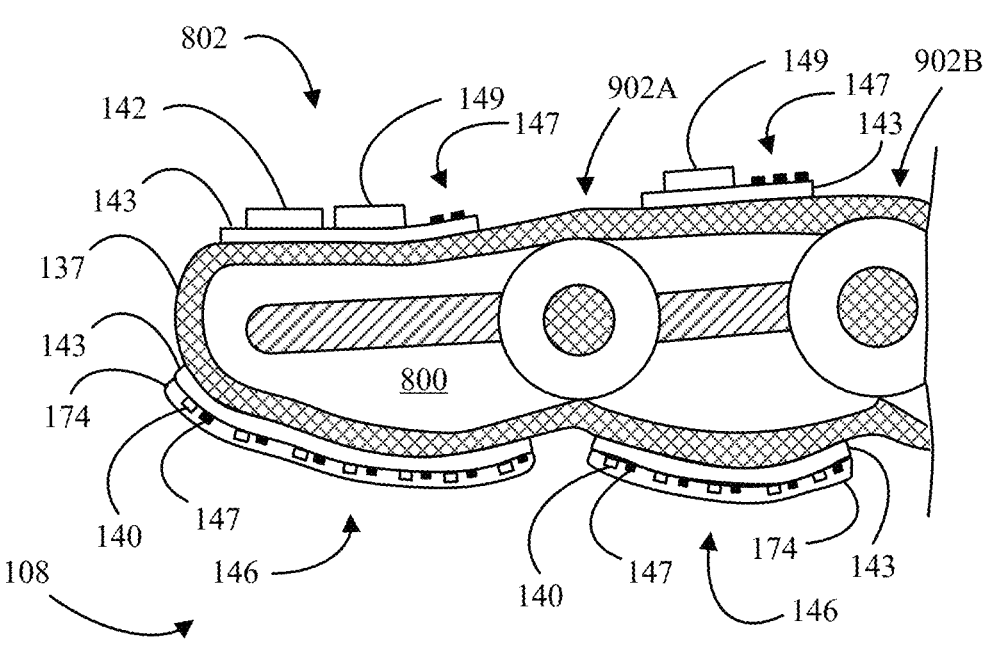
FIG. 8B is a cross-section of a portion of the robotic device.

FIG. 8A is an example of the robotic device 104 with tactile sensing. The robotic device 104 could be configured as a mechanical device wearing a wearable device, such as a robotic hand wearing a sensing glove as shown. In other cases, the robotic device 104 could comprise another configuration, such as a head wearing sensing headwear, foot wearing sensing footwear (e.g., shoes), eyes having sensing eyewear, arms or legs wearing sensing sleeves or pants, torso wearing sensing vest or jacket, and the like. FIG. 8A includes an example of the robotic device 104 configured to resemble the wearable device 102 (e.g., a robotic hand wearing a sensing glove, like a human user wearing the sensing glove in the demonstration environment 110). Referring also to FIG. 8B, a cross-section C-C of a portion of the robotic device 104 is shown by way of example. The cross-section includes a mechanical device 800 (e.g., a robotic finger of a robotic hand) wearing a wearable device 802 (e.g., like the wearable device 102).

In some implementations, the robotic device 104 could be a robotic hand that includes a mechanical thumb, fingers, and palm. For example, referring again to FIG. 3, the robotic hand could be attached to the robotic arm 138, in the robotic environment 112, to repeat the task involving the object 132 and the target 134. The robotic hand could have at least six DOF and the robotic arm 138 could add at least six more DOF. While the robotic device 104 shown in FIG. 8A is a right robotic hand wearing a right sensing glove (shown palmar side), the robotic device 104 could also be configured as a left robotic hand wearing a left sensing glove. Additionally, the robotic device 104 could be configured as one of multiple robotic devices that may be coordinated in a set (e.g., left and right robotic hands, left and right robotic feet, or sleeves on multiple limbs) where the multiple robotic devices are configured to operate with one another (e.g., via a single robotic controller like the robotic controller 116). In some implementations, the wearable device 802 may be removable from the mechanical device 800 (e.g., the sensing glove may be removable from the robotic hand). In some implementations, the wearable device 102 could be taken from the demonstration environment 110 and placed on the mechanical device 800 (e.g., the robotic hand) in the robotic environment 112 to form the robotic device 104 (e.g., the wearable device 102 and the wearable device 802 may be the same). In some implementations, the wearable device may be integrally formed with the mechanical device 800 (e.g., the sensing glove may be inseparable from the robotic hand). In some implementations, the robotic device 104 may include sections 146, or patches, of sensors 140 attached directly to the mechanical device 800.

The robotic device 104, including the wearable device 802 configured to resemble the wearable device 102 or being the wearable device 102, could utilize the information from the wearable device 102 to mirror the user's performance of the task in the robotic environment 112. For example, the robotic device 104 may utilize the sensor array 108 to sense a force applied to the robotic device 104. The robotic device 104 may apply a robotic force until the force applied to the robotic device 104 (e.g., sensed by the sensor array 108) equals the force applied to the wearable device 102 (e.g., via the wearable device 802, sensed by the sensor array 106, and indicated by the information from the wearable controller 114). In another example, the robotic device 104 may utilize the sensor array 108 to sense a motion performed by the robotic device 104. The robotic device 104 may change the motion until the motion performed by the robotic device 104 (e.g., via the wearable device 802, sensed by the sensor array 108) equals the motion performed by the wearable device 102 (e.g., sensed by the sensor array 106, and indicated by the information from the wearable controller 114). The robotic device 104 may additionally sense differences in the robotic environment 112, e.g., based on size, color, or obstructions, and adjust the force and/or the motion based on the differences. In some cases, the robotic device 104 may also utilize machine learning to make the adjustments.

Figure 9:
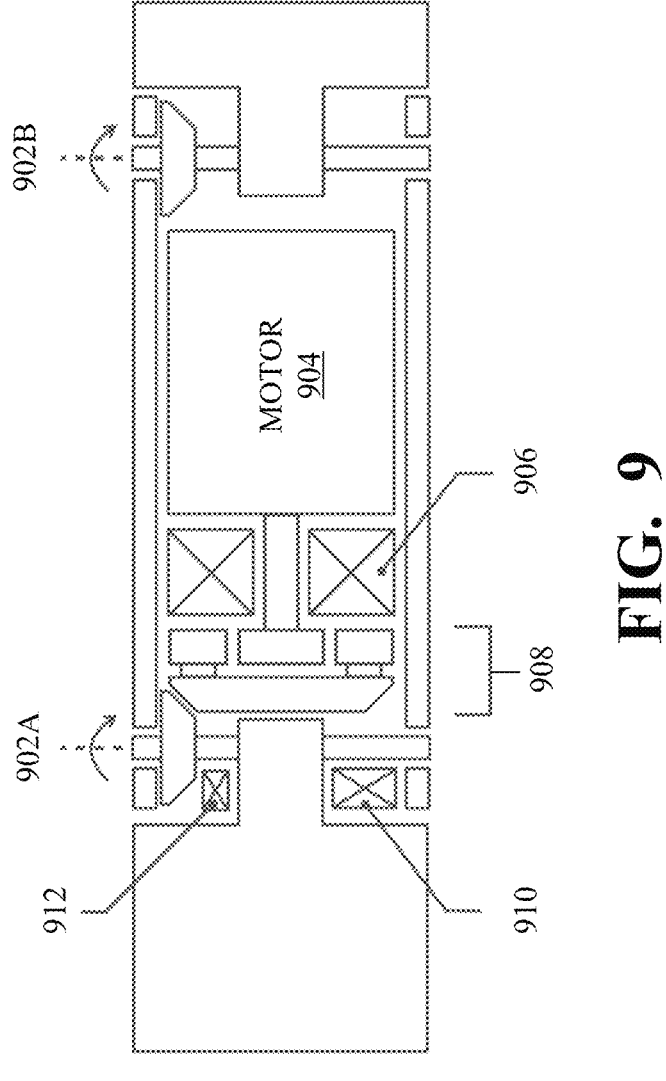
FIG. 9 is an example of a mechanical structure of a robotic device.

FIG. 9 is an example of a cross-section of a mechanical structure 900 of the robotic device 104 (e.g., mechanical device). For example, the mechanical structure 900 could represent a portion of the robotic device 104, such as a finger of a robotic hand (e.g., the cross-section C-C from FIG. 8A). For example, and with additional reference to FIGS. 8A and 8B, the mechanical structure 900 may include one or more rotatable, actuated axes corresponding to joints of a user of the wearable device 102, such as axis 902A (e.g., at a fingertip of the robotic finger) and axis 902B (e.g., at a mid-point of the robotic finger). For example, the axes may be driven by motors, hydraulics, pneumatics, cables, and/or a combination thereof. The axes may correspond to movable joints of a user, such as the joints of the user's finger. Each axis of the mechanical structure 900 may be rotatable based on the action of a driving system, such as a motor (e.g., a DC brushless motor or stepper), a bearing, and/or a gear reducer (e.g., a planetary and/or bevel gear). This configuration may enable utilizing a small motor with a high power density in conjunction with a large gear reduction (e.g., to implement stepper motor joints of the robotic finger).

For example, the axis 902A may be rotatable based on the action of a motor 904, a bearing 906, and a gear reducer 908. The action may be controlled by one or more signals generated in the robotic environment 112. For example, the robotic controller 116 can send one or more signals to drive the motor 904 to cause the bearing 906 and the gear reducer 908 to rotate the portion of the mechanical structure 900 about the axis 902A (e.g., the tip of the finger). In another example, circuitry connected to the motor 904, such as the circuitry 152 coupled with the robotic device 104, can send the one or more signals to the motor 904. In some cases, the robotic controller 116 may generate the one or more signals. In other cases, the action may be driven by hydraulics, pneumatics, cables, and/or a combination thereof.

The mechanical structure 900 may also include sensors, such as a torque sensor 910 and/or an encoder 912. For example, the torque sensor 910 can detect a change in torque associated with the action (e.g., a torque associated with rotation of the structure about the axis 902A). In another example, the encoder 912 can detect a change in angle associated with the action (e.g., an angle of rotation of the structure about the axis 902A). The torque sensor 910 and/or the encoder 912 can enable feedback in a closed loop control system to drive the mechanical structure 900. In some cases, the torque sensor 910 and/or the encoder 912 may enable operating the mechanical structure 900 in a stiffness control mode (e.g., precise tuning of stiffness of the robotic device 104, such as stiffness of the robotic finger, via closed loop control of the actuators). As a result, the configuration of the mechanical structure 900 may enable precise movement and control of the robotic device 104 analogous to that of a human (e.g., focusing on one finger of the hand in this example). The mechanical structure 900 may also enable efficient control of the robotic device 104 without the extensive routing of transmission shafts.

Figure 10:
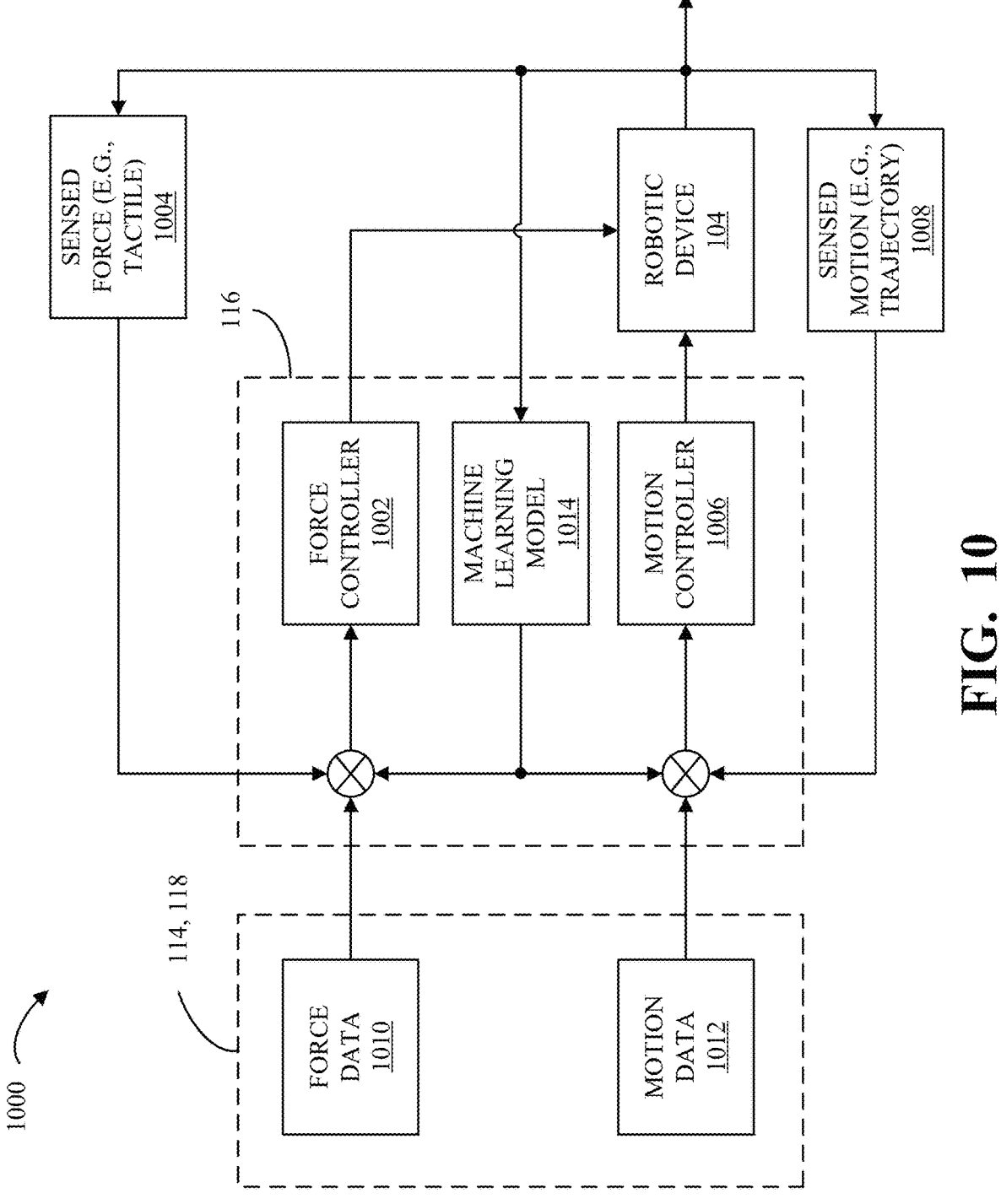
FIG. 10 is an example of a control system for controlling a robotic device.

FIG. 10 is an example of a control system 1000 for controlling the robotic device 104. The control system 1000 may include a force controller 1002 to control a robotic force applied by the robotic device 104, a sensed force 1004 (e.g., tactile data, such a pressure readings, sensed via sensors of the sensor array 108) applied to the robotic device 104, a motion controller 1006 to control a robotic motion performed by the robotic device 104, and a sensed motion 1008 (e.g., a trajectory, position, orientation, velocity, or acceleration, sensed via one or more inertial sensors of the sensor array 108) of the robotic device 104. The control system 1000 can control the robotic force and the robotic motion based on the force data 1010 and the motion data 1012 from the wearable device 102, respectively (e.g., the information from the wearable device 102, communicated by the wearable controller 114 and/or the system controller 118).

For example, the robotic controller 116 can control the robotic device 104 to apply the robotic force based on a closed loop control that matches the force applied to the robotic device 104 (e.g., the sensed force 1004) to the force applied to the wearable device 102 (e.g., the force data 1010). The robotic controller 116 can also control the robotic device 104 to perform the robotic motion based on a closed loop control that matches the measured motion of the robotic device 104 (e.g., the sensed motion 1008) to the motion performed by the wearable device 102 (e.g., the motion data 1012). In some cases, the closed loop control may comprise proportional, integral, and derivative (PID) control.

In some implementations, the control system 1000 may utilize a machine learning model 1014 to validate tasks, sub-tasks, and/or to adapt to changes that are perceived in the robotic environment 112. For example, the robotic controller 116 could invoke the machine learning model 1014 to validate a grasp and/or orientation of the object 132 by the robotic device 104 (e.g., a sub-task performed to repeat a broader task, such as picking up the object and placing it in a target). The machine learning model 1014 could receive the sensed force 1004 and determine, based on training utilizing grasps and/or orientations of different objects corresponding to different force readings, a valid grasp or an invalid grasp of the object, or a valid physical orientation or an invalid physical orientation of the object. Based on the determination, the robotic controller 116 can adjust the force that will be performed by the robotic device 104 (e.g., input to the force controller 1002). In another example, the robotic controller 116 could invoke the machine learning model 1014 to validate a motion of the robotic device 104. The machine learning model 1014 could receive the sensed motion 1008 and determine, based on training utilizing different motions corresponding to different motion readings, a valid physical motion or invalid physical motion of the robotic device 104. Based on the determination, the robotic controller 116 can adjust the motion that will be performed by the robotic device 104 (e.g., input to the motion controller 1006). The machine learning model 1014 can enable many adjustments based on many conditions in this way. The machine learning model may, for example, be or include one or more of a neural network (e.g., a CNN, recurrent neural network, deep neural network, or other neural network), decision tree, vector machine, Bayesian network, cluster-based system, genetic algorithm, deep learning system separate from a neural network, or other machine learning model.

In some implementations, the wearable controller 114 and/or the robotic controller 116 may divide a task into multiple sub-tasks that are time-synchronized. For example, the sub-tasks may include approaching an object, grasping the object, orienting the object, traversing with the object, and inserting the object. For example, the approach sub-task may utilize spatial data for trajectory and orientation (e.g., motion data) and real time image data to adjust hand pose to object pose. The grasp sub-task may comprise an attempt to grasp the object by utilizing spatial data adjusted for the approach, and by confirming the grasp using a tactile signature (e.g., a force data reading). The orient sub-task may comprise a combination of tactile data (e.g., force data) and image data to provide object orientation, and to adjust the grasp until the orientation is achieved. The traverse sub-task may utilize spatial data for collision-free trajectory and retracting with a validated orientation.

Figure 11:
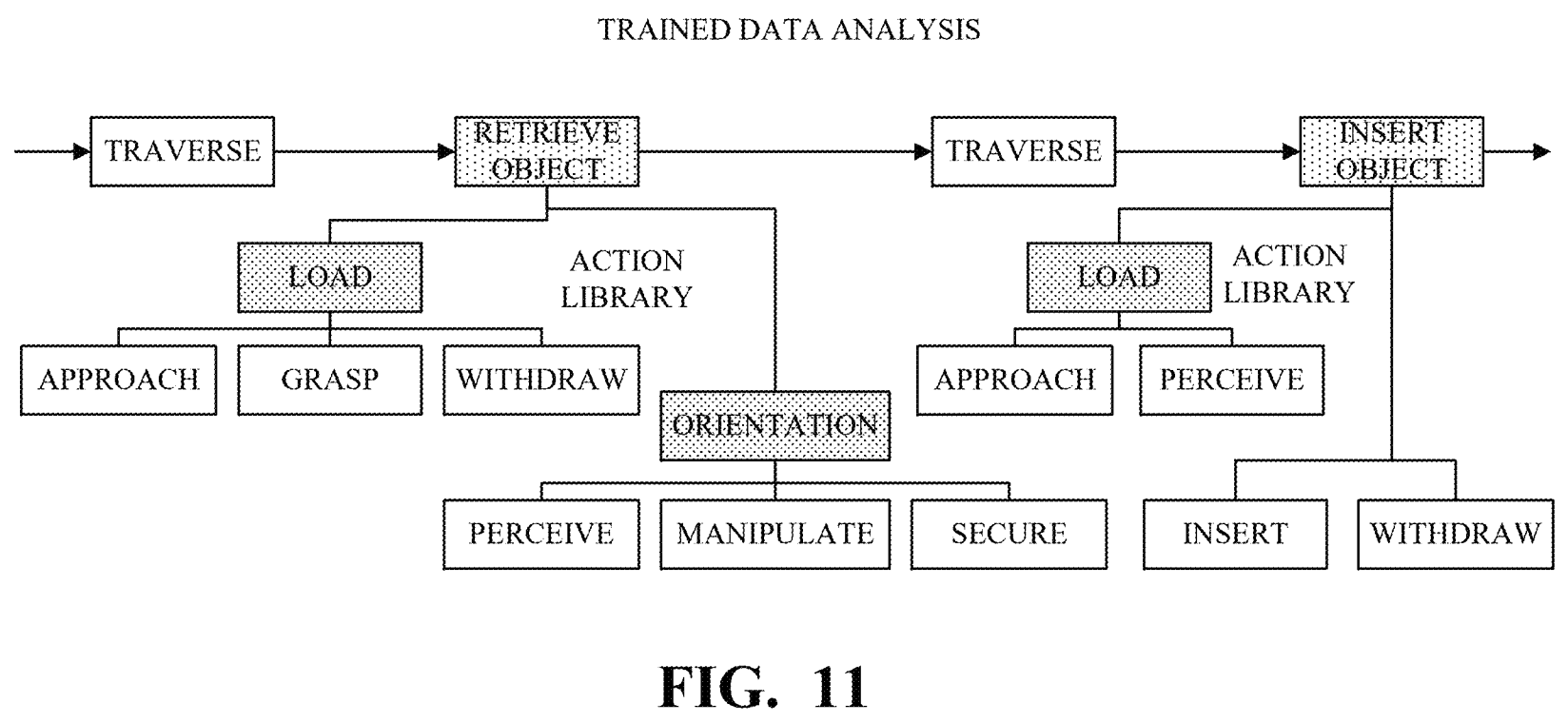

In some implementations, the sub-tasks may be performed by the robotic device 104, via the robotic controller 116, based on trained data analysis (e.g., trained utilizing the wearable device 102). Examples of sub-tasks provided herein are merely illustrative examples of the many different sub-tasks that can be performed in accordance with embodiments, and the embodiments are not limited to these specific sub-tasks. For example, with additional reference to FIG. 11, to perform a task such as picking an object and placing it in a target, the robotic device 104 may be trained, by the wearable device 102, based on a group of sub-tasks. For example, the sub-tasks could include traverse to the object, retrieve the object from a parts tray, traverse to the target, and insert the object in the target. Retrieving the object from the parts tray may further include approaching the object in the parts tray, grasping the object, and withdrawing from the parts tray with the object. Retrieving the object may also include orienting the object based on perceiving the object, manipulating the object, and securing the object. Additionally, inserting the object in the target may further include approaching the target with the object, perceiving the target, inserting the object in the target, and withdrawing from the object and target. The robotic controller 116 may load actions in an action library to enable performance of the various sub-tasks. The actions may be performed based on the sensing described herein.

Figure 12:
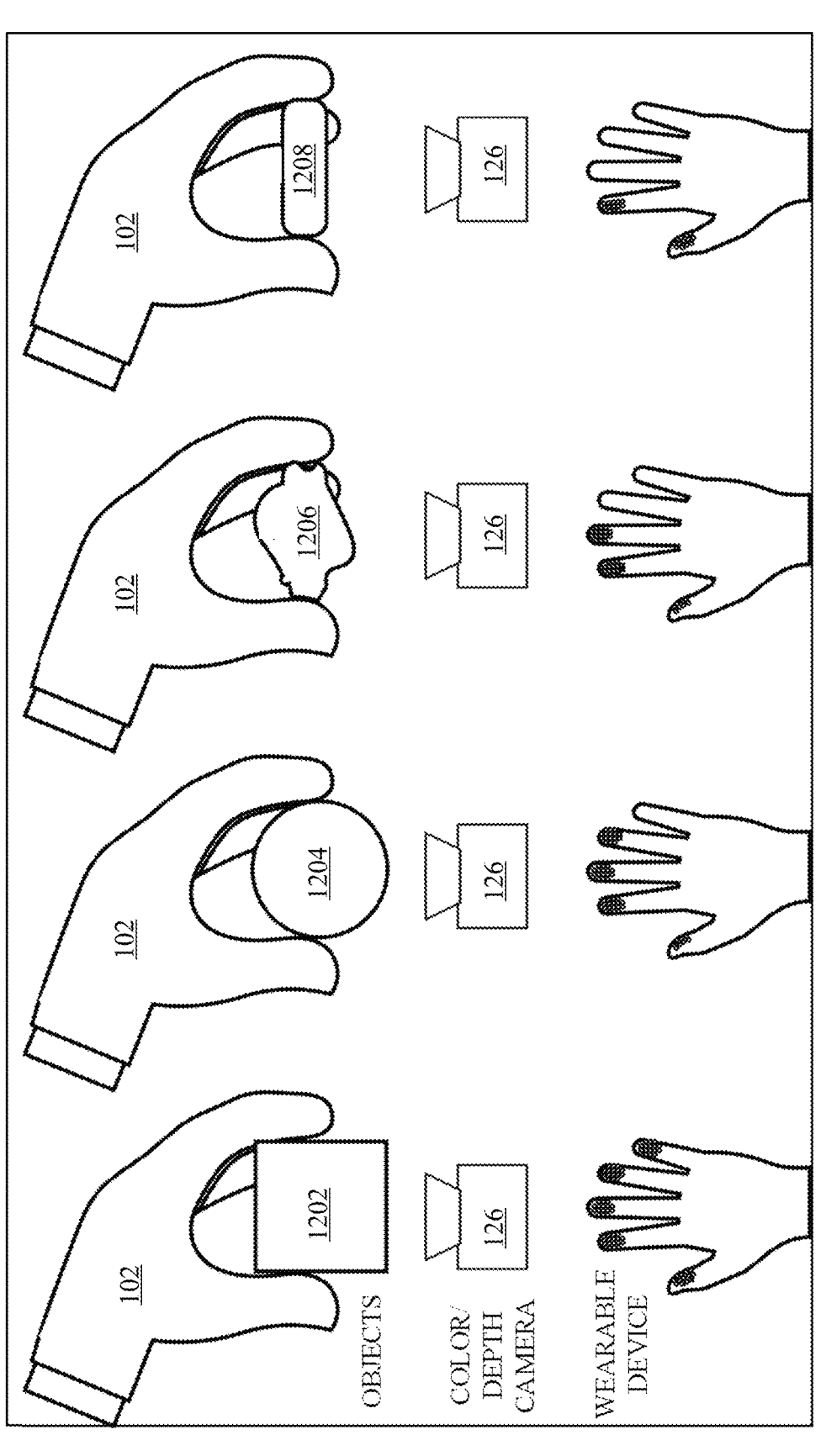
FIGS. 12-22 includes examples of controlling a robotic device based on training utilizing a wearable device.
Figure 13:
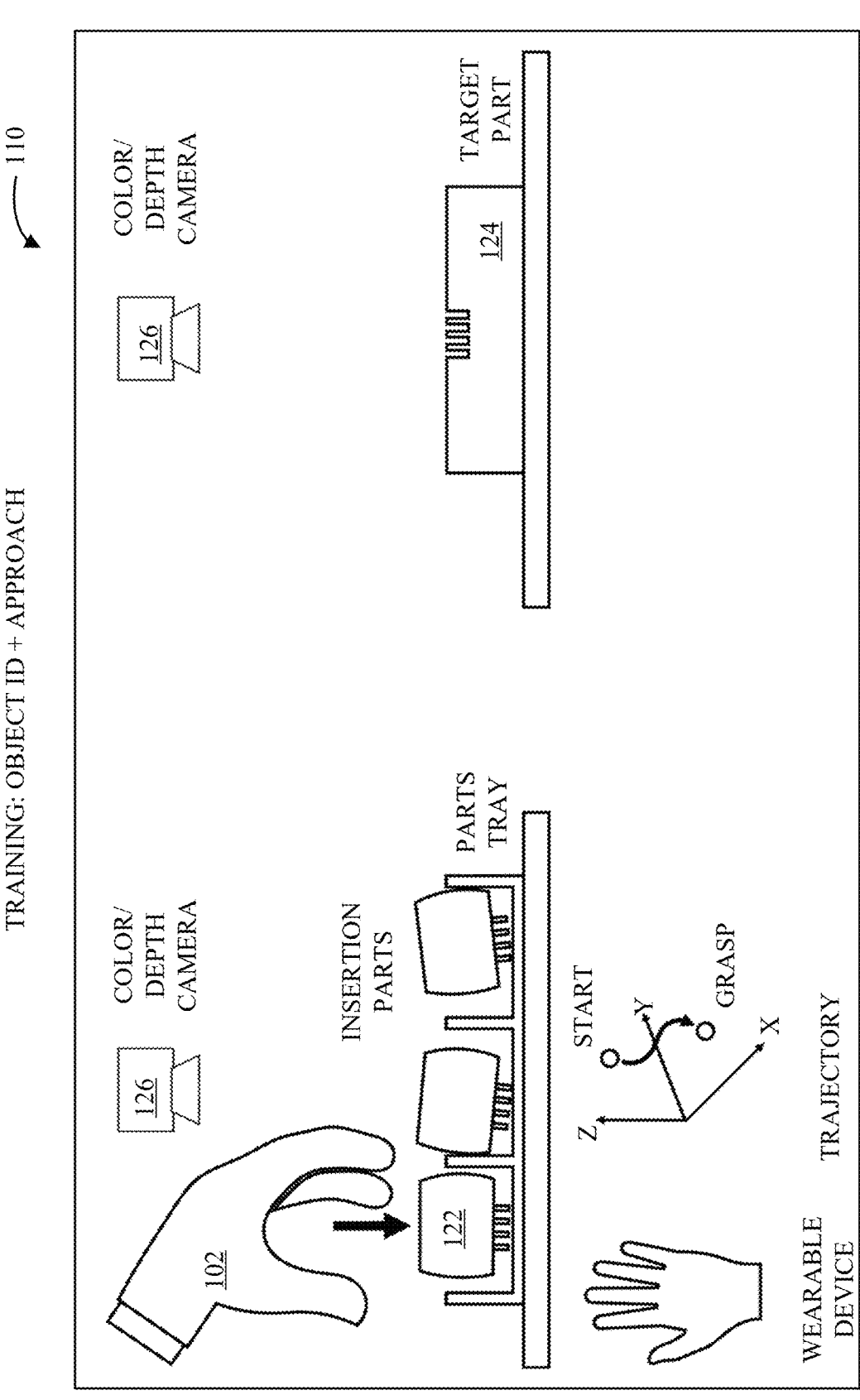

FIGS. 12-22 include an example of controlling the robotic device 104 based on training utilizing the wearable device 102. In FIG. 12, the wearable device 102 may be utilized, in the demonstration environment 110, to map various tactile sensing primitives (e.g., force data readings) to grasps of various objects. For example, grasping object 1202 could result in force data indicating a first pressure pattern applied to the thumb and four fingers. Grasping object 1204 could result in force data indicating a second pressure pattern applied to the thumb and three fingers, and no pressure applied to the fourth finger. Grasping the object 1206 could result in force data indicating a third pressure pattern applied to the thumb and two fingers, and no pressure applied to the other two fingers. Grasping object 1208 could result in force data indicating a fourth pressure pattern applied to the thumb and one finger, and no pressure applied to the other three fingers. Additionally, motion data (e.g., orientation) may be obtained from one or more inertial sensors coupled with the wearable device 102 while determining the primitives. Further, the camera 126 may be utilized to detect color data (e.g., RGB) and/or depth data (e.g., spatial orientation) of the foregoing objects.

To perform a task, such as picking the object 122 and placing the object 122 in the target 124, the wearable device 102 may again be utilized in the demonstration environment 110 to demonstrate the task, including each sub-task.

Figure 14:
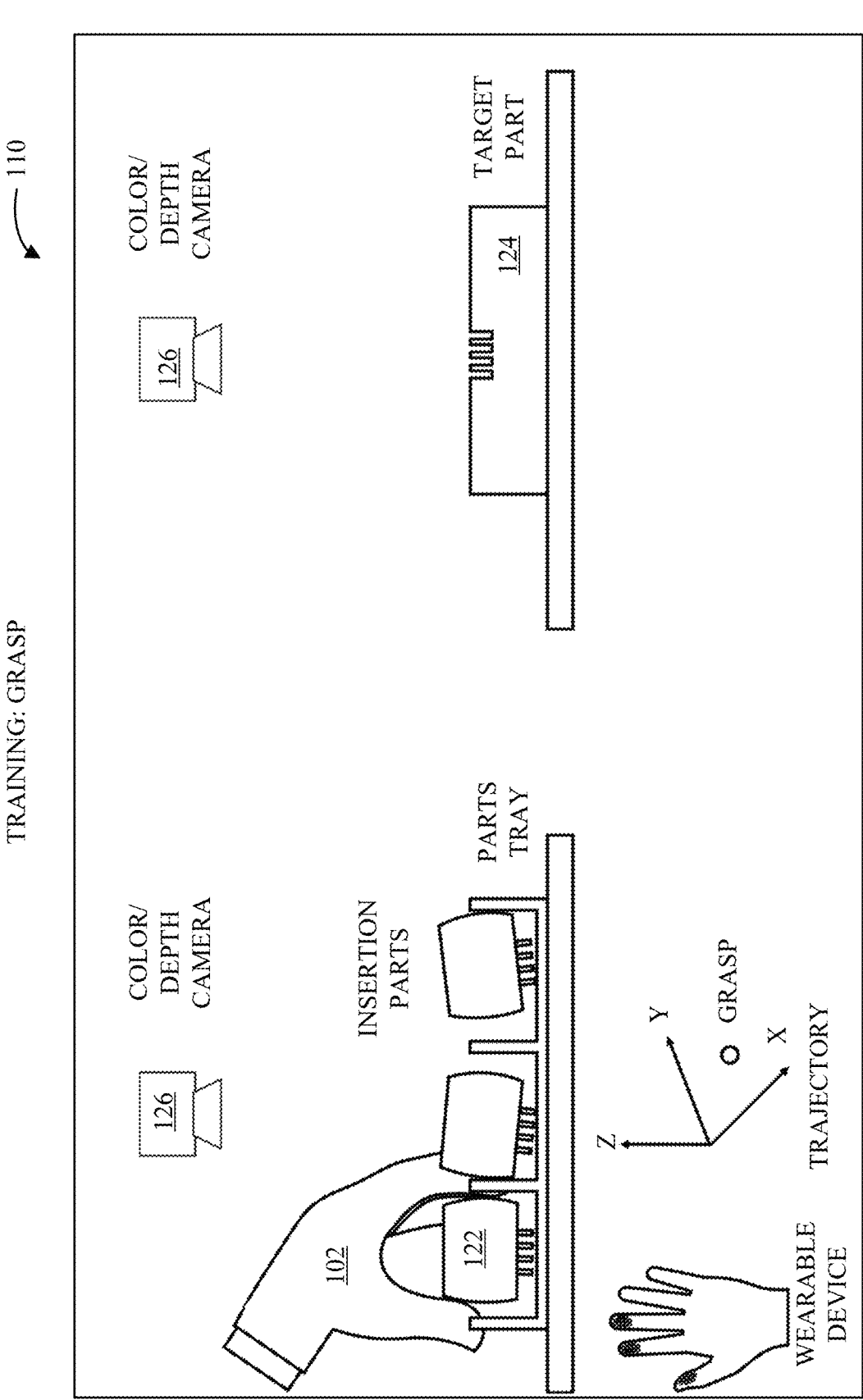
Figure 15:
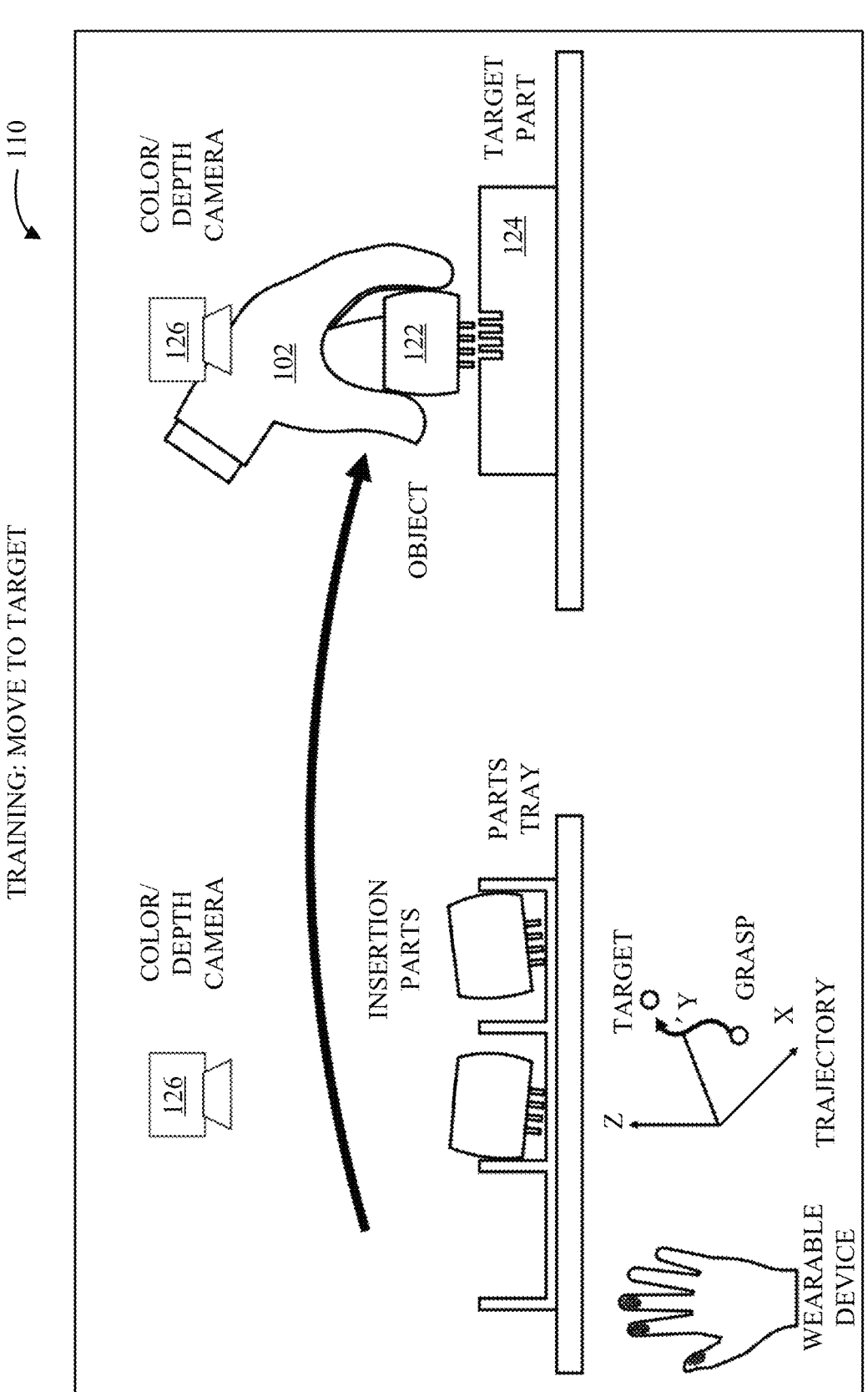
Figure 16:
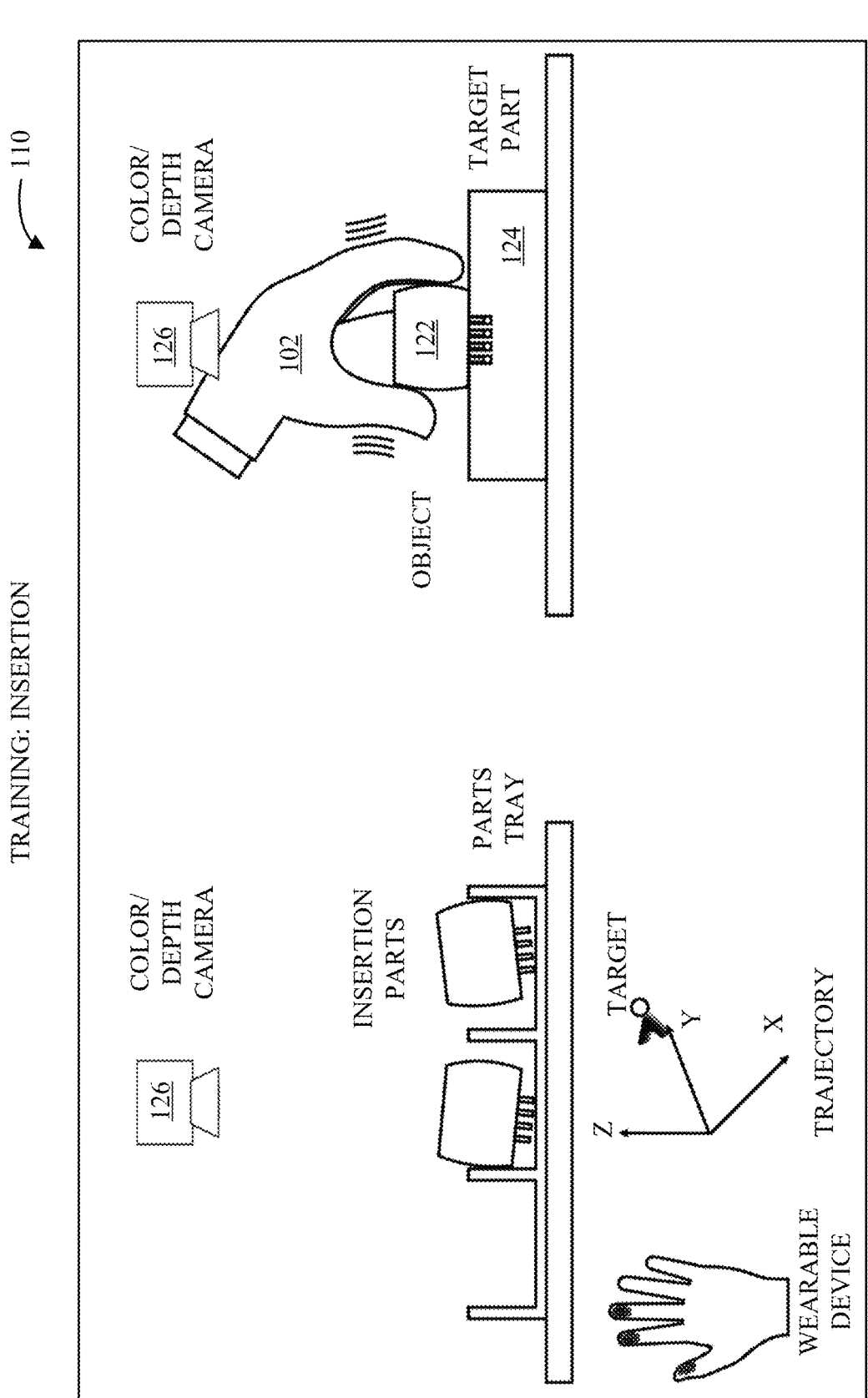
Figure 17:
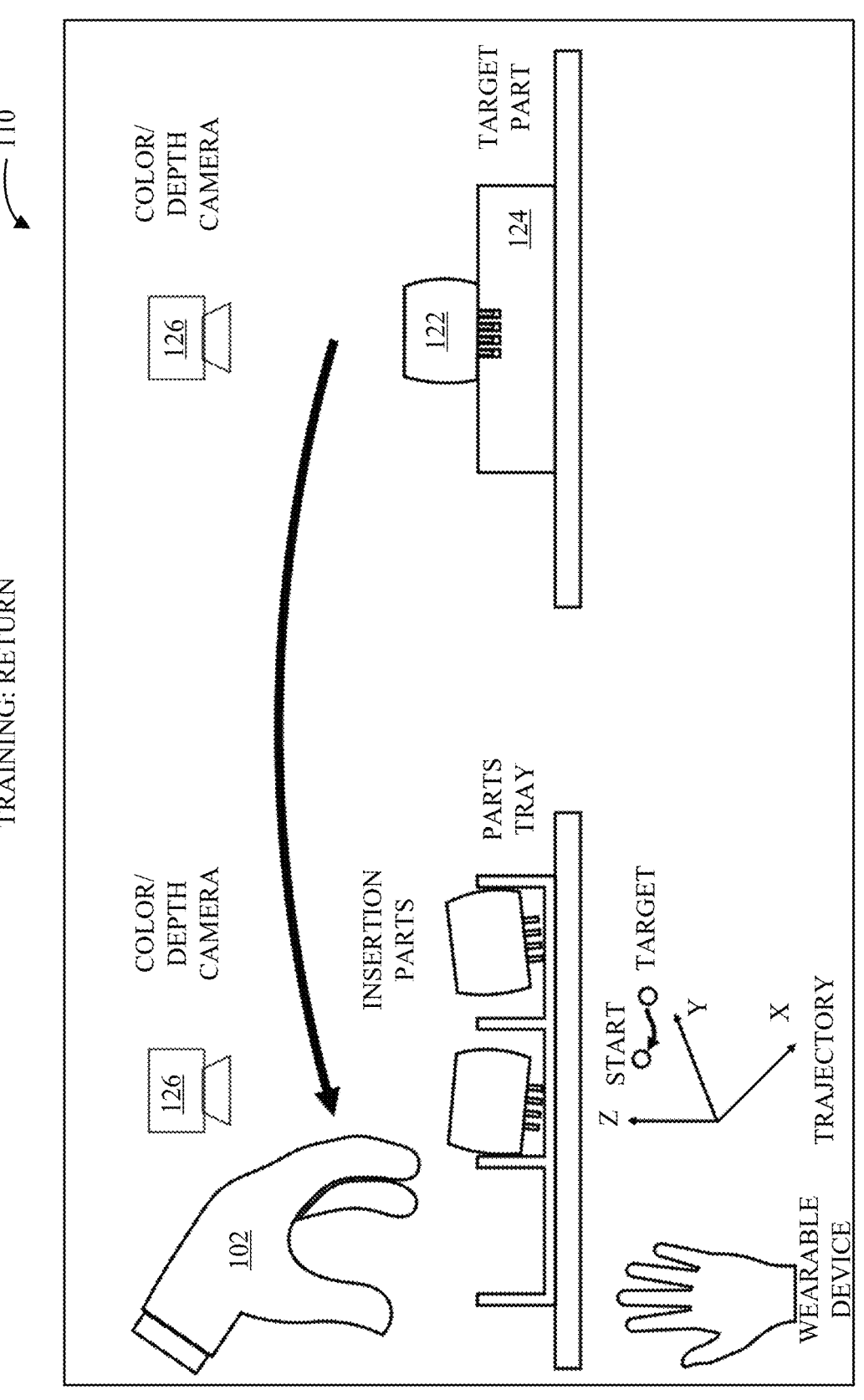
Figure 18:
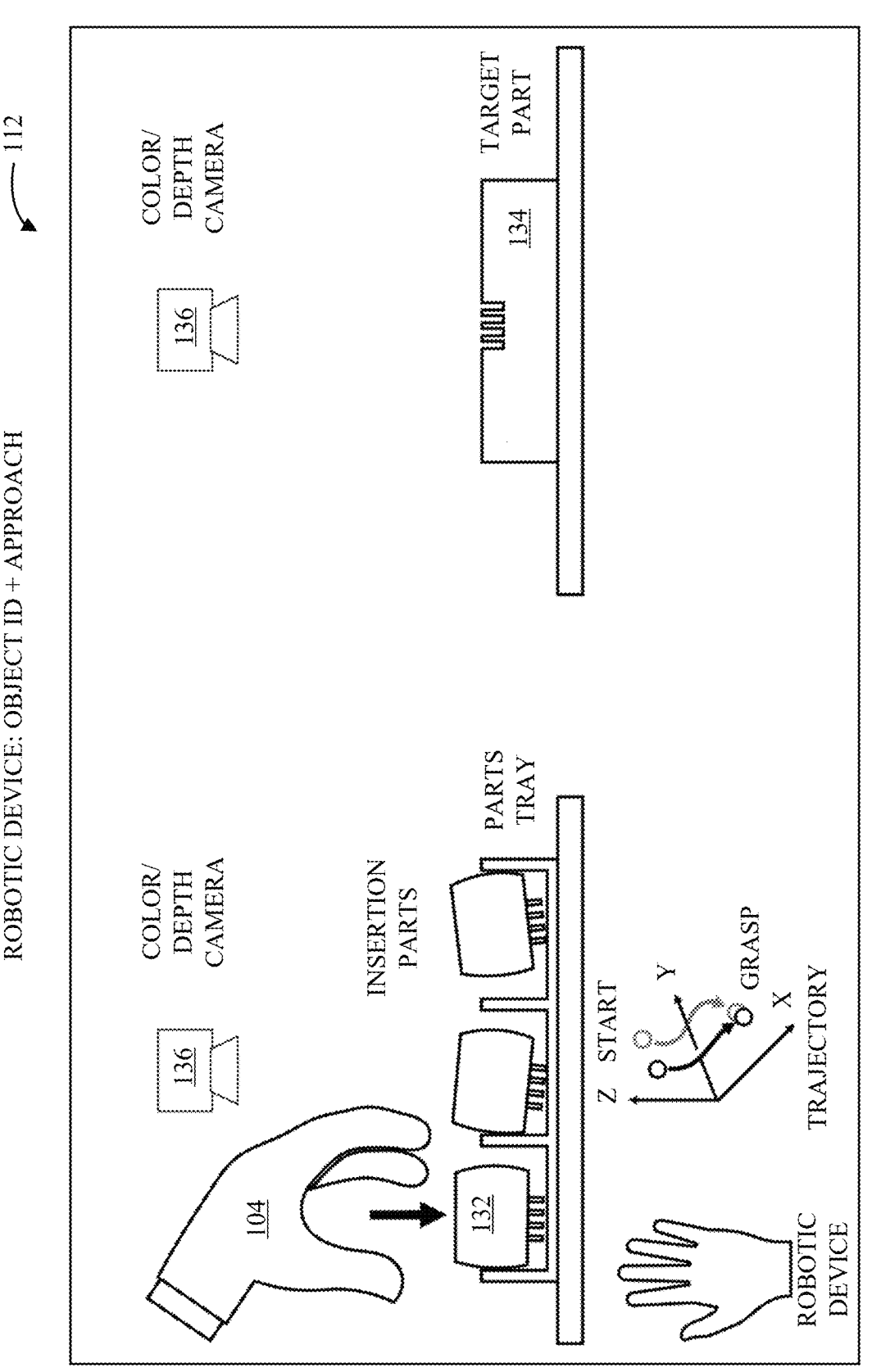

Examples of tasks and sub-tasks provided herein are merely illustrative examples of the many different tasks and sub-tasks that can be performed in accordance with embodiments, and the embodiments are not limited to these specific tasks and sub-tasks. Additionally, the camera 126 may obtain color data and/or depth data associated with the object 122 and the target 124 for each sub-task. For example, in FIG. 13, the wearable device 102 may initially identify and approach the object 122 in the parts tray while sensing data. In FIG. 14, the wearable device 102 may grasp the object 122 in the parts tray while sensing new data. Grasping the object 122 could result in force data indicating pressure patterns applied to the thumb and two fingers, and no pressure applied to the other two fingers (e.g., corresponding to the primitive associated with object 1206). In FIG. 15, the wearable device 102 may traverse with the object 122 to the target 124 while sensing new data. In FIG. 16, the wearable device 102 may insert the object 122 in the target 124 while sensing new data. In FIG. 17, the wearable device 102 may withdraw from the object 122 and the target 124 and return to the parts tray for the next object while sensing new data.

Figure 19:
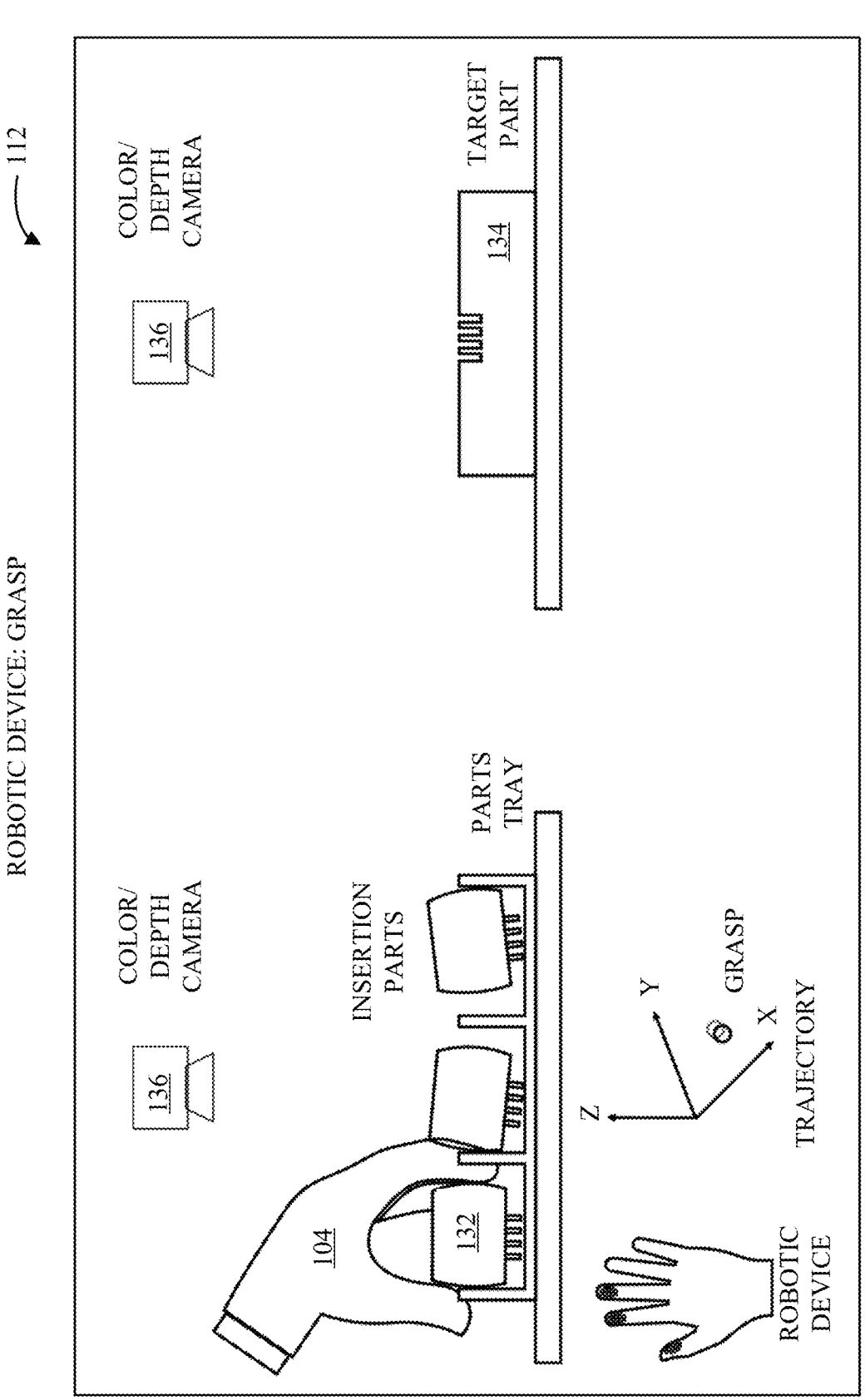
Figure 20:
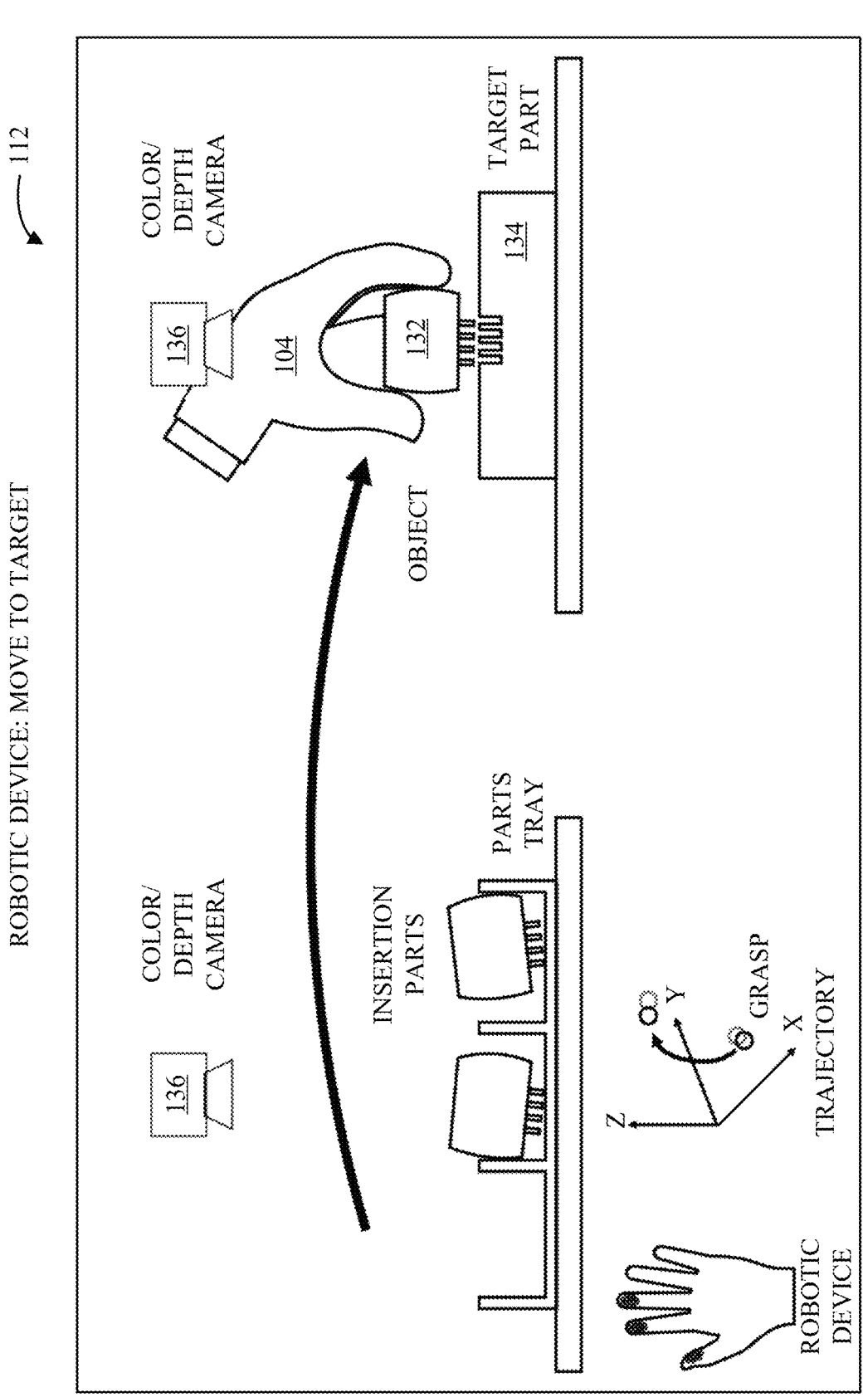
Figure 21:
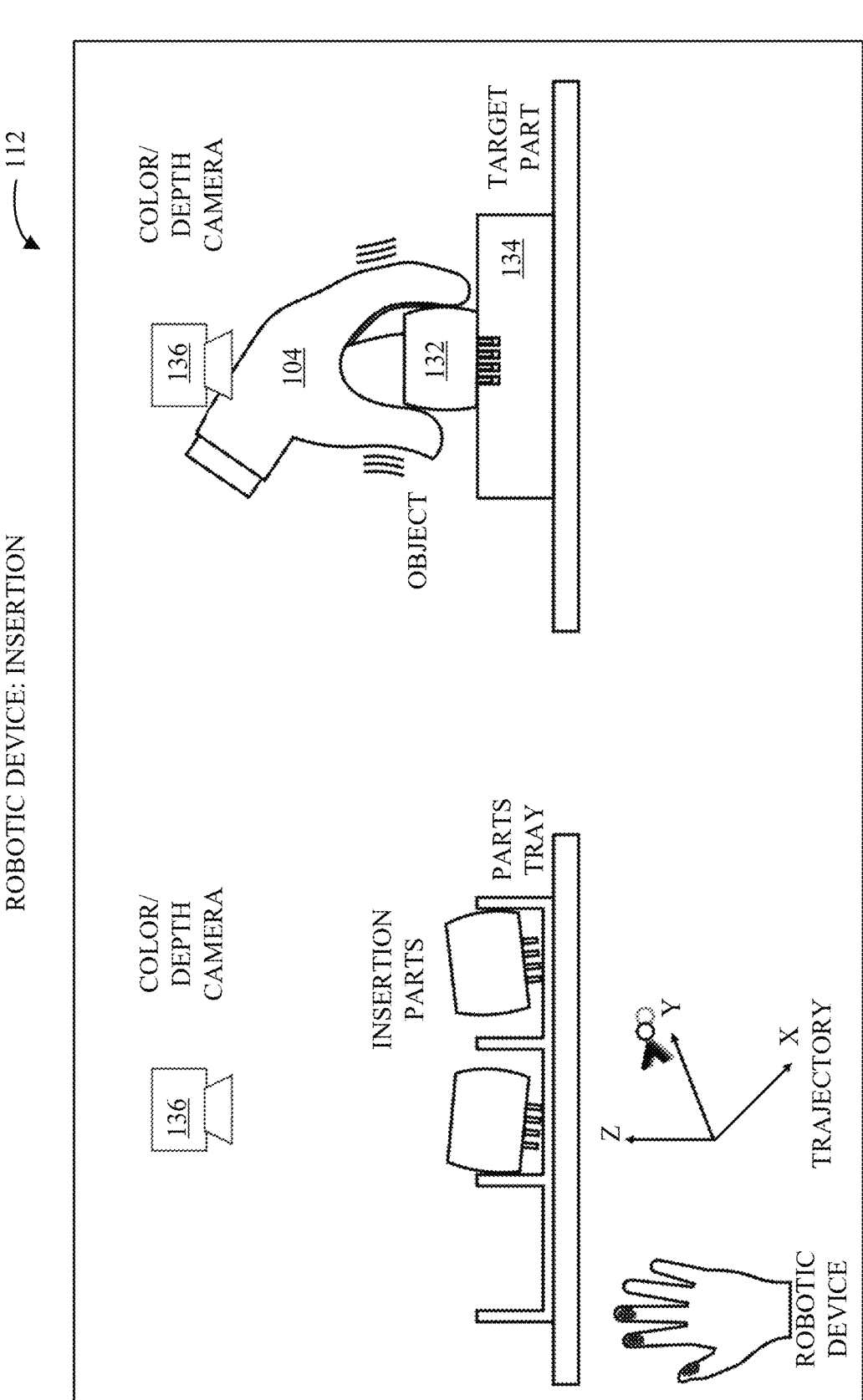
Figure 22:
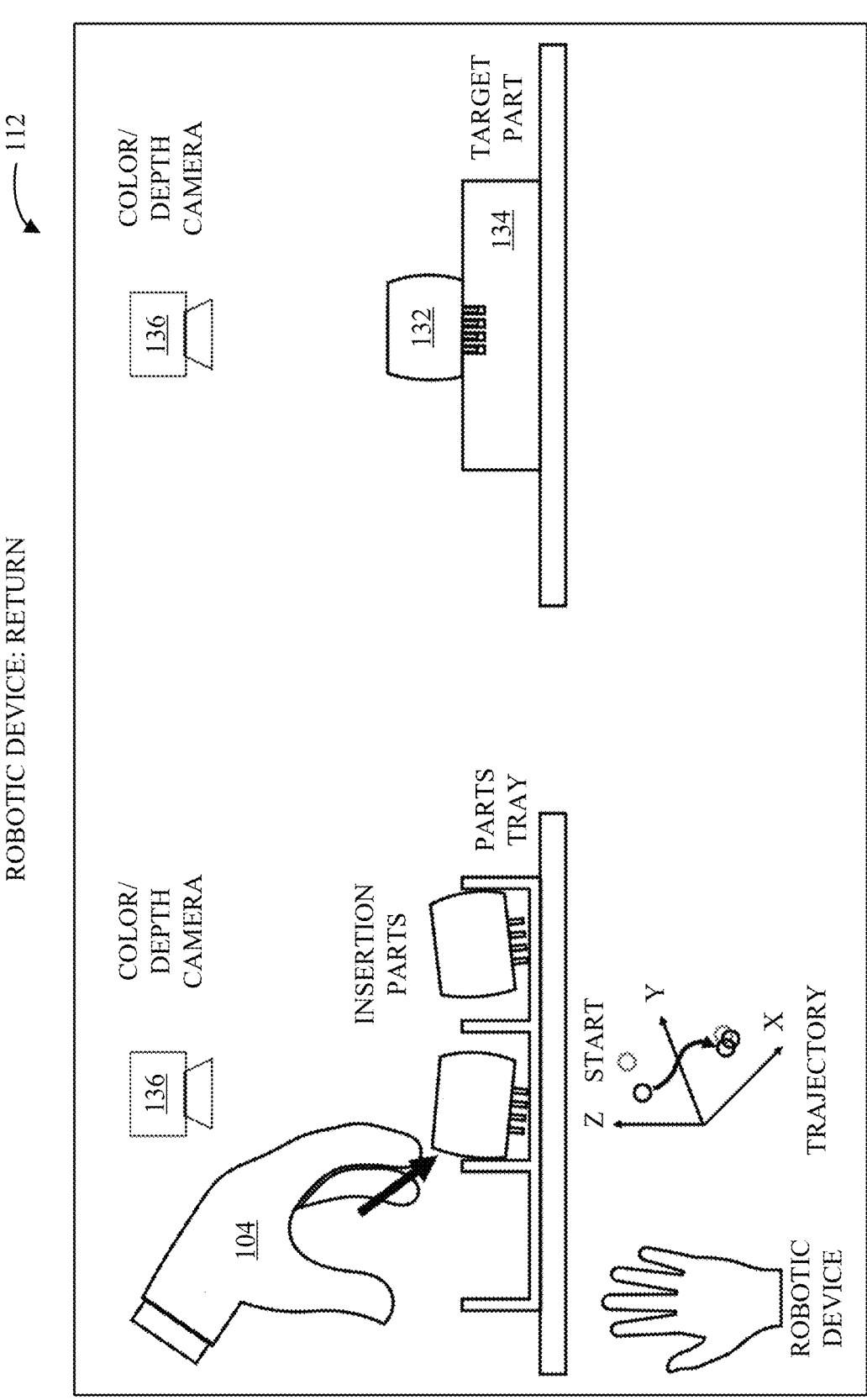

To repeat the task, picking the object 132 and placing the object 132 in the target 134, the robotic device 104 may be utilized in the robotic environment 112 based on the foregoing training, including each sub-task. Additionally, the camera 136 may obtain color data and/or depth data associated with the object 132 and the target 134 for use in conjunction with force data and motion data for each sub-task. For example, in FIG. 18, the robotic device 104 may initially identify and approach the object 132 in the parts tray while sensing data (e.g., perceiving the object 132 based on sensing, and matching the robotic motion to the motion data from the wearable device 102 in FIG. 13). As indicated in the trajectory sub-plot, the robotic device 104 may repeat the motion of the wearable device 102 and the force applied by the wearable device 102 in the approach while adjusting based on differences in the robotic environment 112. In FIG. 19, the robotic device 104 may grasp the object 132 in the parts tray while sensing new data (e.g., matching the robotic motion to the motion data from the wearable device 102 and matching the robotic force to the force data from the wearable device 102 in FIG. 14). Grasping the object 132 could result in force data indicating pressure patterns applied to the thumb and two fingers, and no pressure applied to the other two fingers (e.g., repeating the pressure patterns applied to the wearable device 102, based on the primitive corresponding to object 1206). As indicated in the trajectory sub-plot, the robotic device 104 may repeat the motion of the wearable device 102 and the force applied by the wearable device 102 in the grasp while adjusting one or both based on differences in the robotic environment 112. In FIG. 20, the robotic device 104 may traverse with the object 132 to the target 134 while sensing new data (e.g., perceiving the target 134 based on sensing, and matching the robotic motion to the motion data from the wearable device 102 in FIG. 15). As indicated in the trajectory sub-plot, the robotic device 104 may repeat the motion of the wearable device 102 and the force applied by the wearable device 102 in the traverse while adjusting one or both based on differences in the robotic environment 112. In FIG. 21, the robotic device 104 may insert the object 132 in the target 134 while sensing new data (e.g., matching the robotic motion to the motion data from the wearable device 102 and matching the robotic force to the force data from the wearable device 102 in FIG. 16). As indicated in the trajectory sub-plot, the robotic device 104 may repeat the motion of the wearable device 102 and the force applied by the wearable device 102 in the insertion while adjusting one or both based on differences in the robotic environment 112. In FIG. 22, the robotic device 104 may withdraw from the object 132 and the target 134 and return to the parts tray for the next object while sensing new data (e.g., matching the robotic motion to the motion data from the wearable device 102 in FIG. 17). As indicated in the trajectory sub-plot, the robotic device 104 may repeat the motion of the wearable device 102 and the force applied by the wearable device 102 in the withdraw and return while adjusting one or both based on differences in the robotic environment 112.

Figure 23:
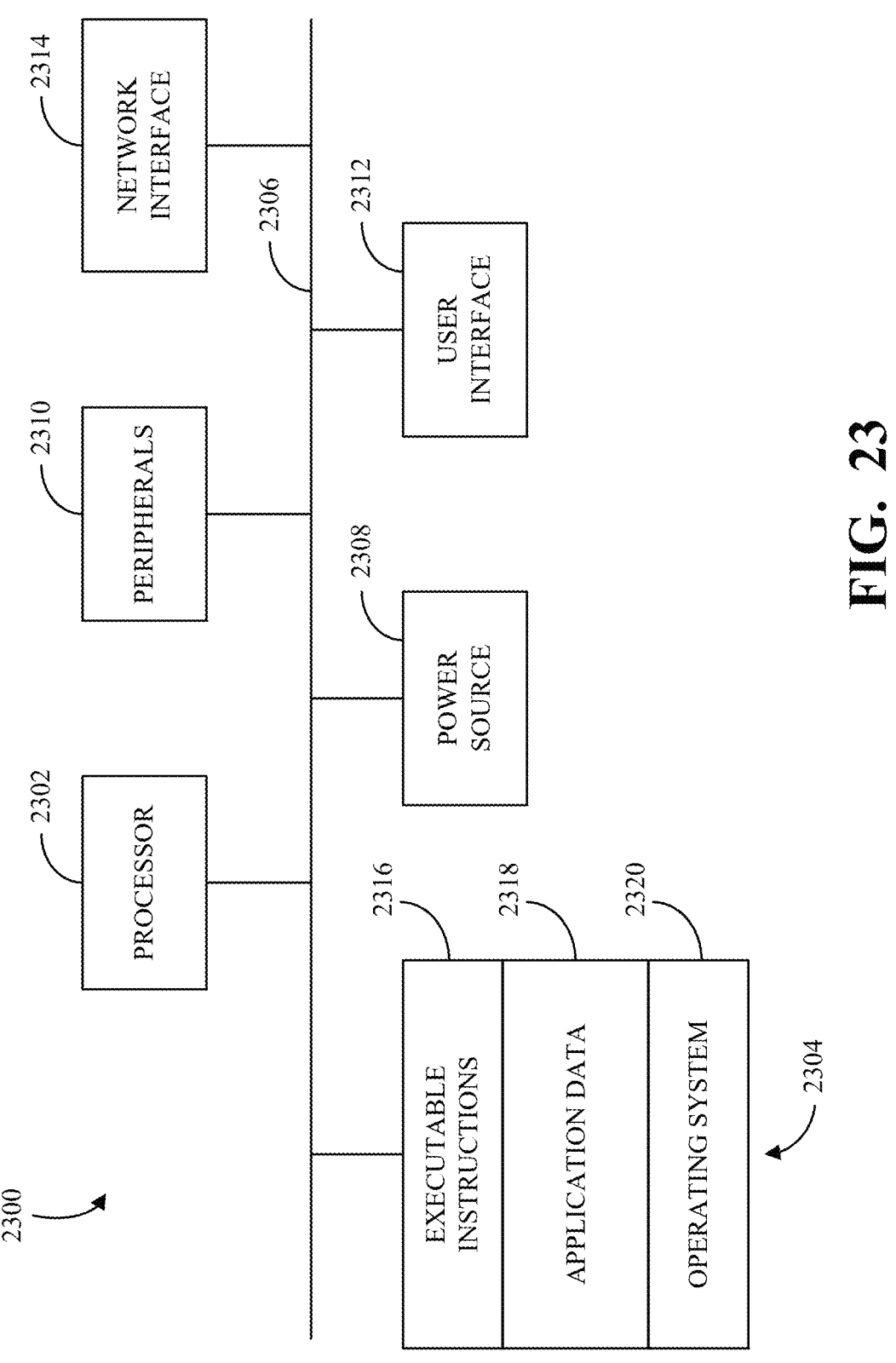
FIG. 23 is a block diagram of an example internal configuration of a computing device for utilizing a wearable device and/or controlling a robotic device.

FIG. 23 is a block diagram of an example internal configuration of a computing device 2300 for utilizing the wearable device 102 and/or controlling the robotic device 104. In various configurations, the computing device 2300 may comprise a computer or other apparatus for controlling the wearable device 102 (e.g., the wearable controller 114), the robotic device 104 (e.g., the robotic controller 116), and/or a system that utilizes both (e.g., the system controller 118).

The computing device 2300 includes components or units, such as a processor 2302, a memory 2304, a bus 2306, a power source 2308, peripherals 2310, a user interface 2312, a network interface 2314, other suitable components, or a combination thereof. One or more of the memory 2304, the power source 2308, the peripherals 2310, the user interface 2312, or the network interface 2314 can communicate with the processor 2302 via the bus 2306.

The processor 2302 is a central processing unit, such as a microprocessor, and can include single or multiple processors having single or multiple processing cores. Alternatively, the processor 2302 can include another type of device, or multiple devices, configured for manipulating or processing information. For example, the processor 2302 can include multiple processors interconnected in one or more manners, including hardwired or networked. The operations of the processor 2302 can be distributed across multiple devices or units that can be coupled directly or across a local area or other suitable type of network. The processor 2302 can include a cache, or cache memory, for local storage of operating data or instructions.

The memory 2304 includes one or more memory components, which may each be volatile memory or non-volatile memory. For example, the volatile memory can be random access memory (RAM) (e.g., a DRAM module, such as dual data rate (DDR) DRAM). In another example, the non-volatile memory of the memory 2304 can be a disk drive, a solid state drive, flash memory, or phase-change memory. In some implementations, the memory 2304 can be distributed across multiple devices. For example, the memory 2304 can include network-based memory or memory in multiple clients or servers performing the operations of those multiple devices.

The memory 2304 can include data for immediate access by the processor 2302. For example, the memory 2304 can include executable instructions 2316, application data 2318, and an operating system 2320. The executable instructions 2316 can include one or more application programs, which can be loaded or copied, in whole or in part, from non-volatile memory to volatile memory to be executed by the processor 2302. For example, the executable instructions 2316 can include instructions for performing some or all of the techniques of this disclosure. The application data 2318 can include user data, database data (e.g., database catalogs or dictionaries), or the like. In some implementations, the application data 2318 can include functional programs, such as a web browser, a web server, a database server, another program, or a combination thereof. The operating system 2320 can be, for example, any known personal or enterprise operating system; an operating system for a mobile device, such as a smartphone or tablet device; or an operating system for a non-mobile device, such as a mainframe computer.

The power source 2308 provides power to the computing device 2300. For example, the power source 2308 can be an interface to an external power distribution system. In another example, the power source 2308 can be a battery, such as where the computing device 2300 is a mobile device or is otherwise configured to operate independently of an external power distribution system. In some implementations, the computing device 2300 may include or otherwise use multiple power sources. In some such implementations, the power source 2308 can be a backup battery.

The peripherals 2310 includes one or more sensors, detectors, or other devices configured for monitoring the computing device 2300 or the environment around the computing device 2300. For example, the peripherals 2310 can include a geolocation component, such as a global positioning system location unit. In another example, the peripherals can include a temperature sensor for measuring temperatures of components of the computing device 2300, such as the processor 2302. In some implementations, the computing device 2300 can omit the peripherals 2310.

The user interface 2312 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, virtual reality display, or other suitable display.

The network interface 2314 provides a connection or link to a network. The network interface 2314 can be a wired network interface or a wireless network interface. The computing device 2300 can communicate with other devices via the network interface 2314 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

FIG. 24 is a flowchart of an example of a process 2400 for utilizing the wearable device 102 and/or controlling the robotic device 104. The process 2400 can be executed using computing devices, such as the systems, hardware, and software described with respect to FIGS. 1-23. The process 2400 can be performed, for example, by executing a machine-readable program or other computer-executable instructions, such as routines, instructions, programs, or other code. The operations of the process 2400 or another technique, method, process, or algorithm described in connection with the implementations disclosed herein can be implemented directly in hardware, firmware, software executed by hardware, circuitry, or a combination thereof.

For simplicity of explanation, the process 2400 is depicted and described herein as a series of operations. However, the operations in accordance with this disclosure can occur in various orders and/or concurrently. Additionally, other operations not presented and described herein may be used. Furthermore, not all illustrated operations may be required to implement a technique in accordance with the disclosed subject matter.

At operation 2402, a system may receive information generated by a wearable device utilized to perform a task. For example, the wearable controller 114 may receive the information from the wearable device 102. The information may include motion data indicating a motion of the wearable device 102 and force data indicating a force applied to the wearable device 102. The force data may be obtained from digital outputs (e.g., the digital outputs 151, 151X, 151Y, or 151Z) of the sensor array 106.

At operation 2404, the system may determine the task associated with the information, from a plurality of other tasks recorded in a library, for the robotic device to repeat. For example, the robotic controller 116 and/or the system controller 118 may determine the task associated with the information, from a plurality of other tasks recorded in the data structure 120, for the robotic device 104 to repeat.

At operation 2406, the system may control a robotic device to perform a robotic motion based on the motion data and apply a robotic force based on the force data to repeat the task. For example, the robotic controller 116, receiving the information from the wearable controller 114, the system controller 118 and/or the data structure 120, may control the robotic device 104 to perform a robotic motion based on the motion data and apply a robotic force based on the force data to repeat the task. The robotic device 104 may include the sensor array 108 generating digital outputs (e.g., the digital outputs 151, 151X, 151Y, or 151Z) to determine a force applied to the robotic device 104 for controlling the robotic force.

At operation 2408, the system may apply an adjustment to at least one of the robotic motion or the robotic force based on a difference between a state in which the wearable device performs the task and another state presented to the robotic device. For example, the robotic controller 116 may apply an adjustment to the robotic motion or the robotic force based on a difference between a state in which the wearable device 102 performs the task and another state presented to the robotic device 104 (e.g., a difference in size, shape, or color of the object, or an obstruction of the path).

At operation 2410, the system may invoke a machine learning model to validate a grasp of an object by the robotic device to repeat the task, or to identify the orientation of the object being grasped for the purpose of motion planning. For example, the robotic controller 116 may invoke the machine learning model 1014 to validate a grasp of an object by the robotic device 104 to repeat the task.

Figure 25:
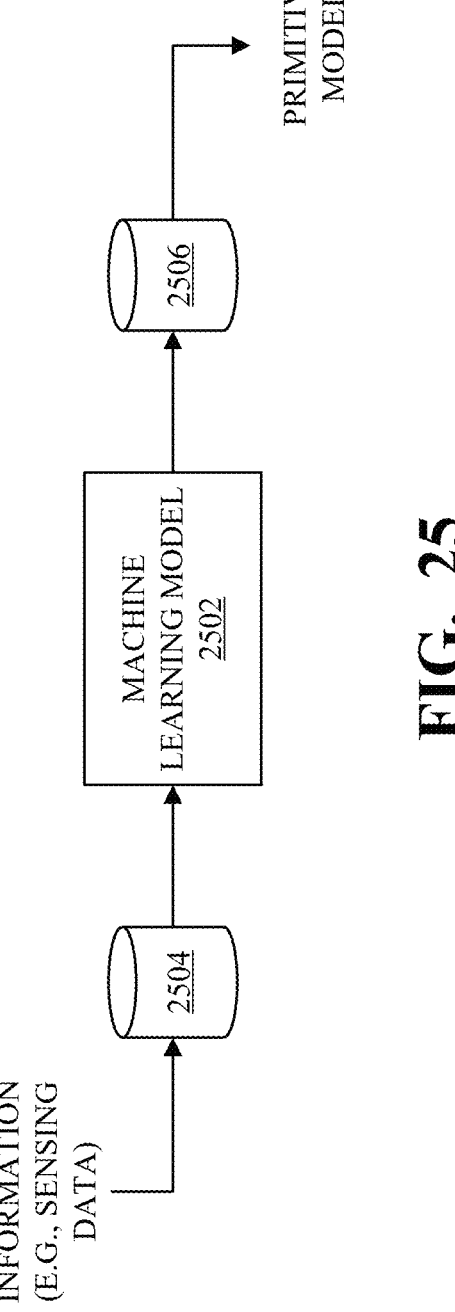
FIG. 25 is an example of invoking a machine learning model to repeat a task.

FIG. 25 is an example of invoking a machine learning model 2502 to repeat a task. For example, a controller (e.g., the wearable controller 114, the system controller 118, and/or the robotic controller 116) may invoke the machine learning model 2502 to control the robotic device 104 to repeat a task performed by the wearable device 102. The machine learning model 2502 may, for example, be or include one or more of a neural network (e.g., a CNN, recurrent neural network, deep neural network, or other neural network), decision tree, vector machine, Bayesian network, cluster-based system, genetic algorithm, deep learning system separate from a neural network, or other machine learning model. To control the robotic device 104 to repeat the task, the controller (e.g., the wearable controller 114) may receive information generated by the wearable device 102 (e.g., when utilized to perform the task) in a raw data stream 2504 (e.g., stored in a first portion of the data structure 120). The information may include sensed data (e.g., force data, motion data, color data, and/or depth data) from the wearable device 102 collected in the demonstration environment 110 (e.g., hand movements and finger positions of a sensing glove). The controller can then invoke the machine learning model 2502 to detect sub-tasks, or primitives, of the task in the raw data stream 2504 based on time-synchronizations (e.g., time slices, resulting in time sliced data or primitive data). The controller can then match each of the time slices (e.g., primitive data) to entries in a library 2506 (e.g., to a corresponding primitive model, stored in a second portion of the data structure 120). The controller can then join the primitive models (e.g., from the library 2506) together to perform a playback of the task by the robotic device 104, including with model fine tuning, to complete the task as demonstrated by the wearable device 102.

Figure 26:
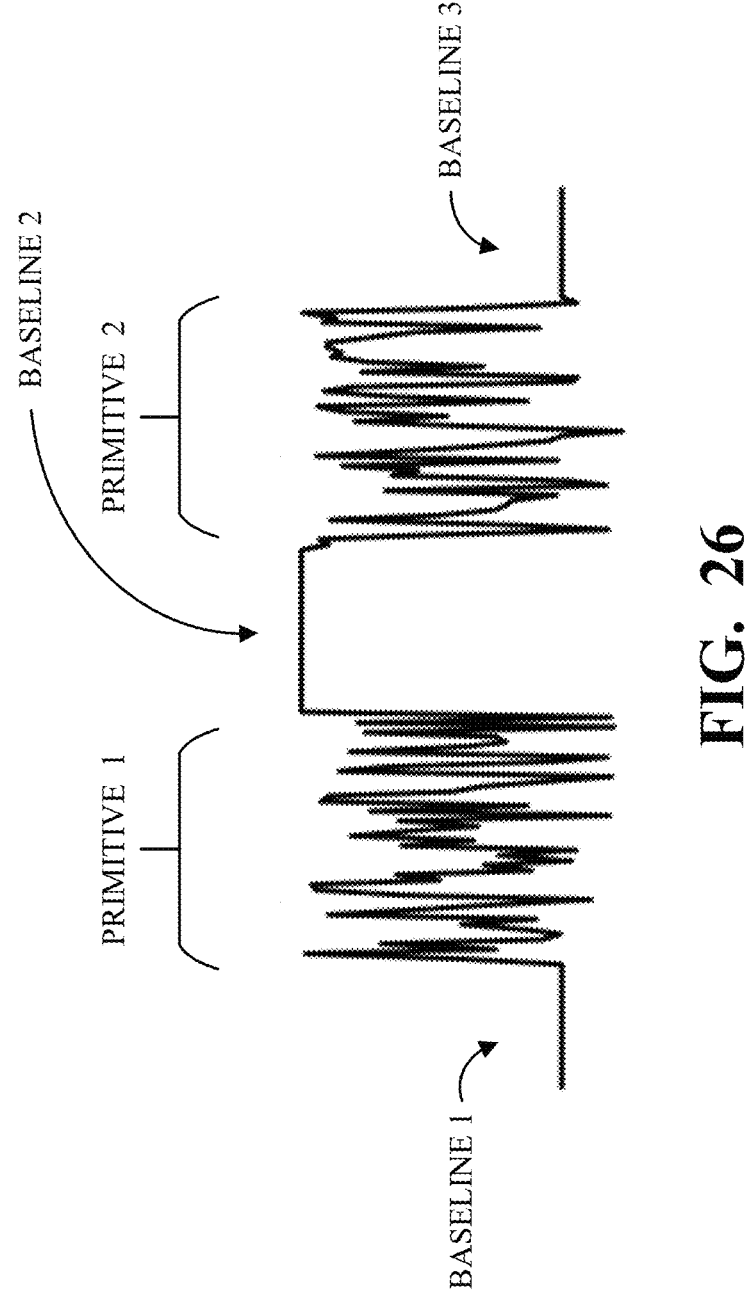
FIG. 26 is an example of detecting primitive data.

FIG. 26 is an example of detecting primitive data. The controller (e.g., the robotic controller 116) can divide the task into primitive data (e.g., discrete collections of primitive data) based on time-synchronizations, or time slices, such as primitive 1 and primitive 2. For example, heuristics can be used to narrow areas of interest in the raw data stream 2504 to parse out time slices of data that can be sent to the machine learning model 2502 for classification and primitive detection. Areas where sensed data (e.g., force data, such as tactile signals from force sensors) change from a baseline (e.g., baseline 1) to an increase greater than a threshold may indicate a time slice corresponding to a sampling of primitive data (e.g., primitive 1, picking a component from a tray or bin, where a grasp moves from empty at a baseline force, to where a component rests in the grip of the robotic device 104 indicated by increased force at a fingertip of the robotic finger). Areas where tactile signals change from the increased force back to a baseline (e.g., baseline 2) may indicate transition to a next time slice corresponding to a next sampling of primitive data (e.g., primitive 2, inserting the component, where the component is released from the grip of the robotic device 104, followed by another baseline force, such as baseline 3).

In some implementations, in addition to the raw data stream 2504, derivative data can be calculated by the controller. For example, sensed data indicating fingertip velocity and acceleration can be derived from sensed data indicating fingertip position over time. Further, image analysis can be used to detect objects or shapes in the raw data stream 2504. The derived data can be used as input to the machine learning model 2502 for classification.

After areas of interest have been identified using heuristics applied to the raw data stream 2504 and/or derivative data, time sliced data from the areas of interest (e.g., the primitive data) can be input into the machine learning model 2502, trained via supervised learning, to identify data patterns that represent each sub-task or primitive. The machine learning model 2502 can output a probability of the raw data stream 2504 and/or derivative data providing a match of each primitive to a primitive model in the library 2506. A highest probability match may be identified.

After primitive models have been identified, each primitive model can be improved using fine tuning or transfer learning by applying the primitive from the raw data stream 2504 (e.g., the underlying time sliced data from the demonstrated sub-task or primitive) to the primitive model in the library 2506. Using this technique, the primitive model may retain foundational training while enhanced by data collected in the demonstration environment 110. In addition, ongoing training can occur as the robotic device 104 successfully completes the primitive and learns during repetitive task operation using reinforcement learning. Fine-tuned primitive models can be joined together to support performance of the task. For example, the controller (e.g., the robotic controller 116) can switch between model-based trajectory motion and data-driven, fine-tuned primitive control based on the time slicing and position of the robotic device 104 during task execution.

As used herein, the term "circuitry" refers to an arrangement of electronic components (e.g., transistors, resistors, capacitors, and/or inductors) that is structured to implement one or more functions. For example, a circuit may include one or more transistors interconnected to form logic gates that collectively implement a logical function. While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A wearable device, comprising:
an article configured to be worn by a user; and
a sensor array coupled with the article, the sensor array including a plurality of sections, each section arranged in a different region of the article, each section including a plurality of sensors that provide multimodal sensing, each sensor of the plurality of sensors including analog to digital conversion (ADC) circuitry to perform analog to digital conversion to generate a digital output indicating sensed data to be sent to a controller, wherein the sensor array obtains force data and generates digital outputs to indicate a force applied to the wearable device.

2. The wearable device of claim 1, wherein sensors of the sensor array are submillimeter in at least one in-plane dimension associated with a footprint.

3. The wearable device of claim 1, wherein sensors of the sensor array have a pitch that is less than 3 millimeters.

4. The wearable device of claim 1, wherein sensors of the sensor array are micro-sensors.

5. The wearable device of claim 1, wherein a first sensor of the sensor array senses a first condition, and a second sensor of the sensor array senses a second condition that is different from the first condition.

6. The wearable device of claim 5, wherein the first sensor senses a normal force, and the second sensor senses a shear force.

7. The wearable device of claim 1, wherein at least one sensor of the sensor array senses a pressure range from 1.5 mg/mm$^2$ to 100 g/mm$^2$.

8. The wearable device of claim 1, wherein a first section of the plurality of sections is coupled with a first region of the article with sensors of the first section having a closer spacing, and
wherein a second section of the plurality of sections is coupled with a second region of the article with sensors of the second section having a further spacing.

9. The wearable device of claim 1, further comprising:
an inertial sensor integrated into the wearable device, wherein the inertial sensor is configured to obtain at least one of a position, an orientation, a velocity, or an acceleration of the wearable device.

10. The wearable device of claim 1, further comprising:
a flexible substrate coupled with a surface of the article, wherein the sensor array is coupled with the flexible substrate.

11. The wearable device of claim 1, wherein the sensor array is connected to conductive threads of the article.

12. The wearable device of claim 1, wherein the article is comprised of a fabric or an elastomer.

13. A sensing glove, comprising:

a glove configured to be worn by a user; and a sensor array coupled with an outer surface of the glove, the sensor array including a section coupled to a fingertip of the glove, the section including a plurality of sensors that provide multimodal sensing, each sensor of the plurality of sensors including analog to digital conversion (ADC) circuitry to perform analog to digital conversion to generate a digital output indicating sensed data to be sent to a controller, wherein the sensor array obtains force data and generates digital outputs to indicate a force applied to the glove.

14. The sensing glove of claim 13, wherein sensors of the sensor array are submillimeter in at least one in-plane dimension associated with a footprint.

15. The sensing glove of claim 13, wherein sensors of the sensor array have a pitch that is less than 3 millimeters.

16. The sensing glove of claim 13, wherein the outer surface includes at least 1,000 sensors.

17. The sensing glove of claim 13, wherein a first sensor of the sensor array senses a first condition, and a second sensor of the sensor array senses a second condition that is different from the first condition.

18. The sensing glove of claim 13, wherein sensors of the sensor array comprise piezoelectric sensors.

19. The sensing glove of claim 13, wherein the sensor array utilizes piezoelectric sensors for proximity sensing.

20. The sensing glove of claim 13, wherein sensors of the sensor array comprise piezoresistive sensors.

21. The sensing glove of claim 13, wherein sensors of the sensor array comprise capacitive sensors.

22. The sensing glove of claim 13, wherein sensors of the sensor array comprise metal foil strain sensors.

23. The sensing glove of claim 13, further comprising:

a flexible substrate coupled with the outer surface of the glove, the flexible substrate having a cutout, wherein the sensor array is coupled with the flexible substrate, and the cutout enables the glove to flex.

\* \* \* \* \*